US012732991B2

(12) United States Patent
Chen et al.

(10) Patent No.: US 12,732,991 B2
(45) Date of Patent: Sep. 8, 2026

(54) REFERENCE SIGNAL PORT ASSOCIATION DETERMINATION FOR SINGLE FREQUENCY NETWORK UPLINK

(71) Applicant: QUALCOMM Incorporated, San Diego, CA (US)

(72) Inventors: Yitao Chen, San Diego, CA (US); Mostafa Khoshnevisan, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 452 days.

(21) Appl. No.: 17/869,573

(22) Filed: Jul. 20, 2022

(65) Prior Publication Data

US 2024/0032023 A1 Jan. 25, 2024

(51) Int. Cl.
*H04W 72/1268* (2023.01)
*H04B 7/06* (2006.01)
*H04L 5/00* (2006.01)

(52) U.S. Cl.
CPC ...... *H04W 72/1268* (2013.01); *H04B 7/0639* (2013.01); *H04L 5/0051* (2013.01)

(58) Field of Classification Search
None
See application file for complete search history.

(56) References Cited

U.S. PATENT DOCUMENTS 11,228,410 B2 1/2022 Sun
2020/0177416 A1* 6/2020 Jiang ..................... H04L 5/0023
2021/0044400 A1* 2/2021 Jiang ..................... H04L 5/0048
2021/0075570 A1* 3/2021 Xi ......................... H04L 5/0051
(Continued)

FOREIGN PATENT DOCUMENTS

WO WO 2019098800 * 5/2019 .......... H04W 72/535
WO WO-2022087807 A1 5/2022

OTHER PUBLICATIONS

Ch. 21 of "Telecommunications Engineer's Reference Book" by Michael J. Simmonds and Luc Ceuppens (Year: 1993).*
(Continued)

*Primary Examiner* — Gregory B Sefcheck
*Assistant Examiner* — Benjamin Peter Welte
(74) *Attorney, Agent, or Firm* — QUALCOMM Incorporated

(57) ABSTRACT

Methods, systems, and devices for wireless communications are described. Some wireless communications systems may support reference signal port association determination for single frequency network (SFN) uplink. For example, a user equipment may receive first control signaling scheduling transmission of sounding reference signals (SRS) from a plurality of SRS resource sets. The UE may receive second control signaling comprising an indication of one or more SRS resources from the plurality of SRS resource sets and scheduling transmission of one or more SFN uplink messages based at least in part on the indication of the one or more SRS resources. The UE may determine a frequency resource association between one or more phase tracking reference signal (PTRS) ports and one or more demodulation reference signal (DMRS) ports of a plurality of DMRS ports based at least in part on a port association rule and the indication of one or more SRS resources.

27 Claims, 15 Drawing Sheets

(56) References Cited

U.S. PATENT DOCUMENTS

| | | | | |
|---|---|---|---|---|
| 2021/0135922 | A1* | 5/2021 | Gao | H04L 27/26 |
| 2021/0184812 | A1* | 6/2021 | MolavianJazi | H04L 1/0041 |
| 2021/0352510 | A1* | 11/2021 | Zhang | H04L 5/0023 |
| 2022/0322410 | A1* | 10/2022 | Matsumura | H04W 72/1273 |
| 2022/0385427 | A1* | 12/2022 | Frenne | H04L 5/0051 |
| 2022/0417965 | A1* | 12/2022 | Wang | H04B 7/0456 |
| 2023/0076139 | A1* | 3/2023 | Muruganathan | H04W 16/28 |
| 2023/0076789 | A1* | 3/2023 | Oteri | H04L 5/0023 |
| 2023/0189250 | A1* | 6/2023 | Go | H04L 5/14 |
| 2023/0208490 | A1 | 6/2023 | Kim et al. | |
| 2023/0309089 | A1* | 9/2023 | Kim | H04L 5/0023 |
| 2023/0344555 | A1* | 10/2023 | Yuan | H04L 5/0023 |
| 2023/0422272 | A1* | 12/2023 | Sun | H04L 5/0044 |
| 2024/0114504 | A1* | 4/2024 | Gao | H04W 72/1268 |

OTHER PUBLICATIONS

International Search Report and Written Opinion—PCT/US2023/070127—ISA/EPO—Nov. 8, 2023.

* cited by examiner

300

| | Layer 410-a | Layer 410-b | Layer 410-c |
|---|---|---|---|
| Port 415-a | 1 | 0 | 0 |
| Port 415-b | 0 | 1 | 0 |
| Port 415-c | 0 | 0 | 1 |
| Port 415-d | 0 | 0 | 0 |

TPMI 405-a

| | Layer 410-a | Layer 410-b | Layer 410-c |
|---|---|---|---|
| Port 415-a | 1 | 0 | 0 |
| Port 415-b | 0 | 1 | 0 |
| Port 415-c | -1 | 0 | 0 |
| Port 415-d | 0 | 0 | 1 |

TPMI 405-b 400-a

FIG. 4A

| | Layer 410-a | Layer 410-b |
|---|---|---|
| Port 415-a | 1 | 0 |
| Port 415-b | 0 | 1 |
| Port 415-c | 0 | 0 |
| Port 415-d | 0 | 0 |

TPMI 405-c

| | Layer 410-a | Layer 410-b |
|---|---|---|
| Port 415-a | 1 | 0 |
| Port 415-b | 0 | 0 |
| Port 415-c | 0 | 1 |
| Port 415-d | 0 | 0 |

TPMI 405-d 400-b

130
105
Network Entity
115

Transceiver
Antenna
1310
1315
Communications Manager
Memory
Code
1330
1325
1320
1340
Processor
1335
1305

1300

REFERENCE SIGNAL PORT ASSOCIATION DETERMINATION FOR SINGLE FREQUENCY NETWORK UPLINK

FIELD OF TECHNOLOGY

The following relates to wireless communications, including reference signal port association determination for single frequency network (SFN) uplink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reference signal port association determination for single frequency network (SFN) uplink. Generally, the techniques described herein may enable a wireless device, such as a user equipment (UE), to determine a frequency resource association between one or more phase tracking reference signal (PTRS) ports and one or more demodulation reference signal (DMRS) ports associated with one or more SFN uplink messages. For example, the UE may receive first control signaling scheduling transmission of sounding reference signals (SRSs) from multiple SRS resource sets, including at least a first SRS resource set and a second SRS resource set. Additionally, the UE may receive second control signaling including an indication of one or more SRS resources from the first SRS resource set, the second SRS resource set, or both. Further, the second control signaling may schedule transmission of one or more SFN uplink messages based on the indication of the one or more SRS resources, where each DMRS port of multiple DMRS ports associated with the one or more SFN uplink messages may be transmitted from a set of distinct antenna panels at the UE. In some cases, the UE may determine a frequency resource association between one or more PTRS ports and one or more DMRS ports of the multiple DMRS ports based on a port association rule and the indication of the one or more SRS resources from the first SRS resource set, the second SRS resource set, or both. The UE may transmit the one or more SFN uplink messages based on the frequency resource association.

A method for wireless communications at a UE is described. The method may include receiving first control signaling scheduling transmission of SRSs from a set of multiple SRS resource sets, including at least a first SRS resource set and a second SRS resource set, receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE, determining a frequency resource association between one or more PTRS ports and one or more DMRS ports of the set of multiple DMRS ports based on a port association rule and the indication of one or more SRS resources, and transmitting the one or more SFN uplink messages based on the frequency resource association.

An apparatus for wireless communications at a UE is described. The apparatus may include a processor, memory coupled with the processor, and instructions stored in the memory. The instructions may be executable by the processor to cause the apparatus to receive first control signaling scheduling transmission of SRSs from a set of multiple SRS resource sets, including at least a first SRS resource set and a second SRS resource set, receive second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE, determine a frequency resource association between one or more PTRS ports and one or more DMRS ports of the set of multiple DMRS ports based on a port association rule and the indication of one or more SRS resources, and transmit the one or more SFN uplink messages based on the frequency resource association.

Another apparatus for wireless communications at a UE is described. The apparatus may include means for receiving first control signaling scheduling transmission of SRSs from a set of multiple SRS resource sets, including at least a first SRS resource set and a second SRS resource set, means for receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE, means for determining a frequency resource association between one or more PTRS ports and one or more DMRS ports of the set of multiple DMRS ports based on a port association rule and the indication of one or more SRS resources, and means for transmitting the one or more SFN uplink messages based on the frequency resource association.

A non-transitory computer-readable medium storing code for wireless communications at a UE is described. The code may include instructions executable by a processor to receive first control signaling scheduling transmission of SRSs from a set of multiple SRS resource sets, including at least a first SRS resource set and a second SRS resource set, receive second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE, determine a frequency resource association between one or more PTRS ports and one or more DMRS ports of the set of multiple DMRS ports based on a port association rule and the indication of one or more SRS resources, and transmit the one or more SFN uplink messages based on the frequency resource association.

In some examples of the method, apparatuses, and non-transitory computer-readable medium described herein, a maximum quantity of PTRS ports for the UE may be greater than one, the one or more SFN uplink messages may be non-codebook based messages, the port association rule indicates that matching SRS resources indices of the first SRS resource set and the second SRS resource set may have a same PTRS port index, and determining the frequency resource association between the one or more DMRS ports and the one or more PTRS ports may be based on one or more SRS resources from the first SRS resource set or from the second SRS resource set.

In some examples of the method, apparatuses, and non-transitory computer-readable medium described herein, a maximum quantity of PTRS ports for the UE may be greater than one, the one or more SFN uplink messages may be non-codebook based messages, and determining the frequency resource association between the one or more DMRS ports and the one or more PTRS ports may be based on one or more indicated SRS resources from either the first SRS resource set or the second SRS resource set having a lowest SRS resource set identifier.

In some examples of the method, apparatuses, and non-transitory computer-readable medium described herein, a maximum quantity of PTRS ports for the UE may be greater than one, the one or more SFN uplink messages may be non-codebook based messages, the indication of the one or more SRS resources from the set of multiple SRS resource sets includes a first indication of one or more SRS resources from the first SRS resource set that results in a first quantity of PTRS ports and a second indication of one or more SRS resources from the second SRS resource set that results in a second quantity of PTRS ports, and determining the frequency resource association between the one or more DMRS ports and the one or more PTRS ports may be based on the first quantity of PTRS ports, the second quantity of PTRS ports, or both.

Some examples of the method, apparatuses, and non-transitory computer-readable medium described herein may further include operations, features, means, or instructions for determining the frequency resource association between the one or more DMRS ports and the one or more PTRS ports may be based on either the one or more indicated SRS resources from the first SRS resource set or the one or more indicated SRS resources from the second SRS resource set resulting in a greater quantity of PTRS ports.

Some examples of the method, apparatuses, and non-transitory computer-readable medium described herein may further include operations, features, means, or instructions for determining the frequency resource association between the one or more DMRS ports and the one or more PTRS ports may be based on either the one or more indicated SRS resources from the first SRS resource set or the one or more indicated SRS resources from the second SRS resource set resulting in a lesser quantity of PTRS ports.

In some examples of the method, apparatuses, and non-transitory computer-readable medium described herein, a maximum quantity of PTRS ports for the UE may be greater than one, the one or more SFN uplink messages may be codebook based messages, the port association rule indicates that sharing associations between DMRS ports and PTRS port indices as indicated in a transmit precoding matrix may be common across a set of multiple transmit precoding matrices associated with the one or more SFN uplink messages, and determining the frequency resource association between the one or more DMRS ports and the one or more PTRS ports may be based on a first transmit precoding matrix associated with the first SRS resource set or from a second transmit precoding matrix associated with the second SRS resource set.

In some examples of the method, apparatuses, and non-transitory computer-readable medium described herein, a maximum quantity of PTRS ports for the UE may be greater than one, the one or more SFN uplink messages may be codebook based messages, the indication of the one or more SRS resources from the set of multiple SRS resource sets includes a first indication of a first transmit precoding matrix and a second indication of a second transmit precoding matrix, and determining the frequency resource association between the one or more DMRS ports and the one or more PTRS ports may be based on a selection of the first transmit precoding matrix or the second transmit precoding matrix based on a transmit precoding matrix selection criteria.

In some examples of the method, apparatuses, and non-transitory computer-readable medium described herein, the transmit precoding matrix selection criteria may be based on a lowest SRS resource set identifier associated with either the first transmit precoding matrix or the second transmit precoding matrix.

In some examples of the method, apparatuses, and non-transitory computer-readable medium described herein, the transmit precoding matrix selection criteria may be based on a quantity of PTRS ports resulting from the first transmit precoding matrix or the second transmit precoding matrix.

In some examples of the method, apparatuses, and non-transitory computer-readable medium described herein, the transmit precoding matrix selection criteria may be based on a codebook subset associated with the first transmit precoding matrix and the second transmit precoding matrix and the codebook subset indicates a partial-coherent transmit precoding matrix or a non-coherent transmit precoding matrix.

In some examples of the method, apparatuses, and non-transitory computer-readable medium described herein, the transmit precoding matrix selection criteria may be based on a quantity of physical uplink shared channel ports associated with the first transmit precoding matrix and the second transmit precoding matrix.

In some examples of the method, apparatuses, and non-transitory computer-readable medium described herein, receiving the second control signaling may include operations, features, means, or instructions for receiving an indication of a value corresponding to one DMRS port of the set of multiple DMRS ports, where determining the frequency resource association between the one or more DMRS ports and a PTRS port of the one or more PTRS ports may be based on the value and a table indicating an association between a single PTRS port and the set of multiple DMRS ports.

In some examples of the method, apparatuses, and non-transitory computer-readable medium described herein, the port association rule indicates that a first set of one or more PTRS ports may be associated with the first SRS resource set and a second set of one or more PTRS ports may be associated with the first SRS resource set and the first set of one or more PTRS ports may be different than the second set of one or more PTRS ports.

In some examples of the method, apparatuses, and non-transitory computer-readable medium described herein, determining the frequency resource association between the one or more DMRS ports and the one or more PTRS ports may include operations, features, means, or instructions for determining a first quantity of PTRS ports associated with the first SRS resource set based on the indication of the one or more SRS resources and determining a second quantity of PTRS ports associated with the second SRS resource set based on the indication of the one or more SRS resources.

In some examples of the method, apparatuses, and non-transitory computer-readable medium described herein, determining the frequency resource association between the one or more PTRS ports and the one or more DMRS ports of the set of multiple DMRS ports may include operations, features, means, or instructions for determining the first PTRS port index may be associated with the first SRS resource set based on the first bit and determining the second PTRS port index may be associated with the second SRS resource set based on the second bit.

In some examples of the method, apparatuses, and non-transitory computer-readable medium described herein, determining the frequency resource association between the one or more PTRS ports and the one or more DMRS ports of the set of multiple DMRS ports may include operations, features, means, or instructions for determining each PTRS index of the first set of one or more PTRS port indices may be associated with a respective DMRS port based on the first set of bits, where the first set of bits may be associated with the first SRS resource set and determining each PTRS index of the second set of one or more PTRS port indices may be associated with a respective DMRS port based on the second set of bits, where the second set of bits may be associated with the second SRS resource set.

A method for wireless communications at a network entity is described. The method may include outputting first control signaling scheduling transmission of SRSs from a set of multiple SRS resource sets, including at least a first SRS resource set and a second SRS resource set, outputting second control signaling including an indication of one or more SRS resources from the set of multiple SRS resource sets and scheduling transmission of one or more SFN uplink messages based on the indication of the one or more SRS resources, determining a frequency resource association between one or more PTRS ports and one or more DMRS ports of a set of multiple DMRS ports based on a port association rule and the indication of one or more SRS resources, and receiving the one or more SFN uplink messages based on the port association rule.

An apparatus for wireless communications at a network entity is described. The apparatus may include a processor, memory coupled with the processor, and instructions stored in the memory. The instructions may be executable by the processor to cause the apparatus to output first control signaling scheduling transmission of SRSs from a set of multiple SRS resource sets, including at least a first SRS resource set and a second SRS resource set, output second control signaling including an indication of one or more SRS resources from the set of multiple SRS resource sets and scheduling transmission of one or more SFN uplink messages based on the indication of the one or more SRS resources, determine a frequency resource association between one or more PTRS ports and one or more DMRS ports of a set of multiple DMRS ports based on a port association rule and the indication of one or more SRS resources, and receive the one or more SFN uplink messages based on the port association rule.

Another apparatus for wireless communications at a network entity is described. The apparatus may include means for outputting first control signaling scheduling transmission of SRSs from a set of multiple SRS resource sets, including at least a first SRS resource set and a second SRS resource set, means for outputting second control signaling including an indication of one or more SRS resources from the set of multiple SRS resource sets and scheduling transmission of one or more SFN uplink messages based on the indication of the one or more SRS resources, means for determining a frequency resource association between one or more PTRS ports and one or more DMRS ports of a set of multiple DMRS ports based on a port association rule and the indication of one or more SRS resources, and means for receiving the one or more SFN uplink messages based on the port association rule.

A non-transitory computer-readable medium storing code for wireless communications at a network entity is described. The code may include instructions executable by a processor to output first control signaling scheduling transmission of SRSs from a set of multiple SRS resource sets, including at least a first SRS resource set and a second SRS resource set, output second control signaling including an indication of one or more SRS resources from the set of multiple SRS resource sets and scheduling transmission of one or more SFN uplink messages based on the indication of the one or more SRS resources, determine a frequency resource association between one or more PTRS ports and one or more DMRS ports of a set of multiple DMRS ports based on a port association rule and the indication of one or more SRS resources, and receive the one or more SFN uplink messages based on the port association rule.

In some examples of the method, apparatuses, and non-transitory computer-readable medium described herein, a maximum quantity of PTRS ports for a UE may be greater than one, the one or more SFN uplink messages may be non-codebook based messages, and the port association rule indicates that matching SRS resources indices of the first SRS resource set and the second SRS resource set may have a same PTRS port index.

In some examples of the method, apparatuses, and non-transitory computer-readable medium described herein, a maximum quantity of PTRS ports for a UE may be greater than one, the one or more SFN uplink messages may be non-codebook based messages, and determining the frequency resource association between the one or more DMRS ports and the one or more PTRS ports may be based on one or more indicated SRS resources from either the first SRS resource set or the second SRS resource set having a lowest SRS resource set identifier.

In some examples of the method, apparatuses, and non-transitory computer-readable medium described herein, a maximum quantity of PTRS ports for a UE may be greater than one, the one or more SFN uplink messages may be non-codebook based messages, the indication of the one or more SRS resources from the set of multiple SRS resource sets includes a first indication of one or more SRS resources from the first SRS resource set that results in a first quantity of PTRS ports and a second indication of one or more SRS resources from the second SRS resource set that results in a second quantity of PTRS ports, and determining the frequency resource association between the one or more DMRS ports and the one or more PTRS ports may be based on the first quantity of PTRS ports, the second quantity of PTRS ports, or both.

In some examples of the method, apparatuses, and non-transitory computer-readable medium described herein, a maximum quantity of PTRS ports for a UE may be greater than one, the one or more SFN uplink messages may be codebook based messages, the port association rule indicates that sharing associations between DMRS ports and PTRS port indices as indicated in a transmit precoding matrix may be common across a set of multiple transmit precoding matrices associated with the one or more SFN uplink messages, and determining the frequency resource association between the one or more DMRS ports and the one or more PTRS ports may be based on a first transmit precoding matrix associated with the first SRS resource set or from a second transmit precoding matrix associated with the second SRS resource set.

In some examples of the method, apparatuses, and non-transitory computer-readable medium described herein, a maximum quantity of PTRS ports for a UE may be greater than one, the one or more SFN uplink messages may be codebook based messages, the indication of the one or more SRS resources from the set of multiple SRS resource sets includes a first indication of a first transmit precoding matrix and a second indication of a second transmit precoding matrix, and determining the frequency resource association between the one or more DMRS ports and the one or more PTRS ports may be based on a selection of the first transmit precoding matrix or the second transmit precoding matrix based on a transmit precoding matrix selection criteria.

In some examples of the method, apparatuses, and non-transitory computer-readable medium described herein, outputting the second control signaling may include operations, features, means, or instructions for outputting an indication of a value corresponding to one DMRS port of a set of multiple DMRS ports associated with a UE, where determining the frequency resource association between the one or more DMRS ports and a PTRS port of the one or more PTRS ports may be based on the value and a table indicating an association between a single PTRS port and the set of multiple DMRS ports.

In some examples of the method, apparatuses, and non-transitory computer-readable medium described herein, the port association rule indicates that a first set of one or more PTRS ports may be associated with the first SRS resource set and a second set of one or more PTRS ports may be associated with the first SRS resource set and the first set of one or more PTRS ports may be different than the second set of one or more PTRS ports.

In some examples of the method, apparatuses, and non-transitory computer-readable medium described herein, determining the frequency resource association between the one or more DMRS ports and the one or more PTRS ports may include operations, features, means, or instructions for determining a first quantity of PTRS ports associated with the first SRS resource set based on the indication of the one or more SRS resources and determining a second quantity of PTRS ports associated with the second SRS resource set based on the indication of the one or more SRS resources.

In some examples of the method, apparatuses, and non-transitory computer-readable medium described herein, determining the frequency resource association between the one or more PTRS ports and the one or more DMRS ports of the set of multiple DMRS ports may include operations, features, means, or instructions for determining the first PTRS port index may be associated with the first SRS resource set based on the first bit and determining the second PTRS port index may be associated with the second SRS resource set based on the second bit.

In some examples of the method, apparatuses, and non-transitory computer-readable medium described herein, determining the frequency resource association between the one or more PTRS ports and the one or more DMRS ports of the set of multiple DMRS ports may include operations, features, means, or instructions for determining each PTRS index of the first set of one or more PTRS port indices may be associated with a respective DMRS port based on the first set of bits, where the first set of bits may be associated with the first SRS resource set and determining each PTRS index of the second set of one or more PTRS port indices may be associated with a respective DMRS port based on the second set of bits, where the second set of bits may be associated with the second SRS resource set.

BRIEF DESCRIPTION OF THE DRAWINGS

FIGS. 4A and 4B illustrate examples of transmit precoding matrix indicator (TPMI) sets that supports reference signal port association determination for SFN uplink in accordance with one or more aspects of the present disclosure.

DETAILED DESCRIPTION

Figure 1:
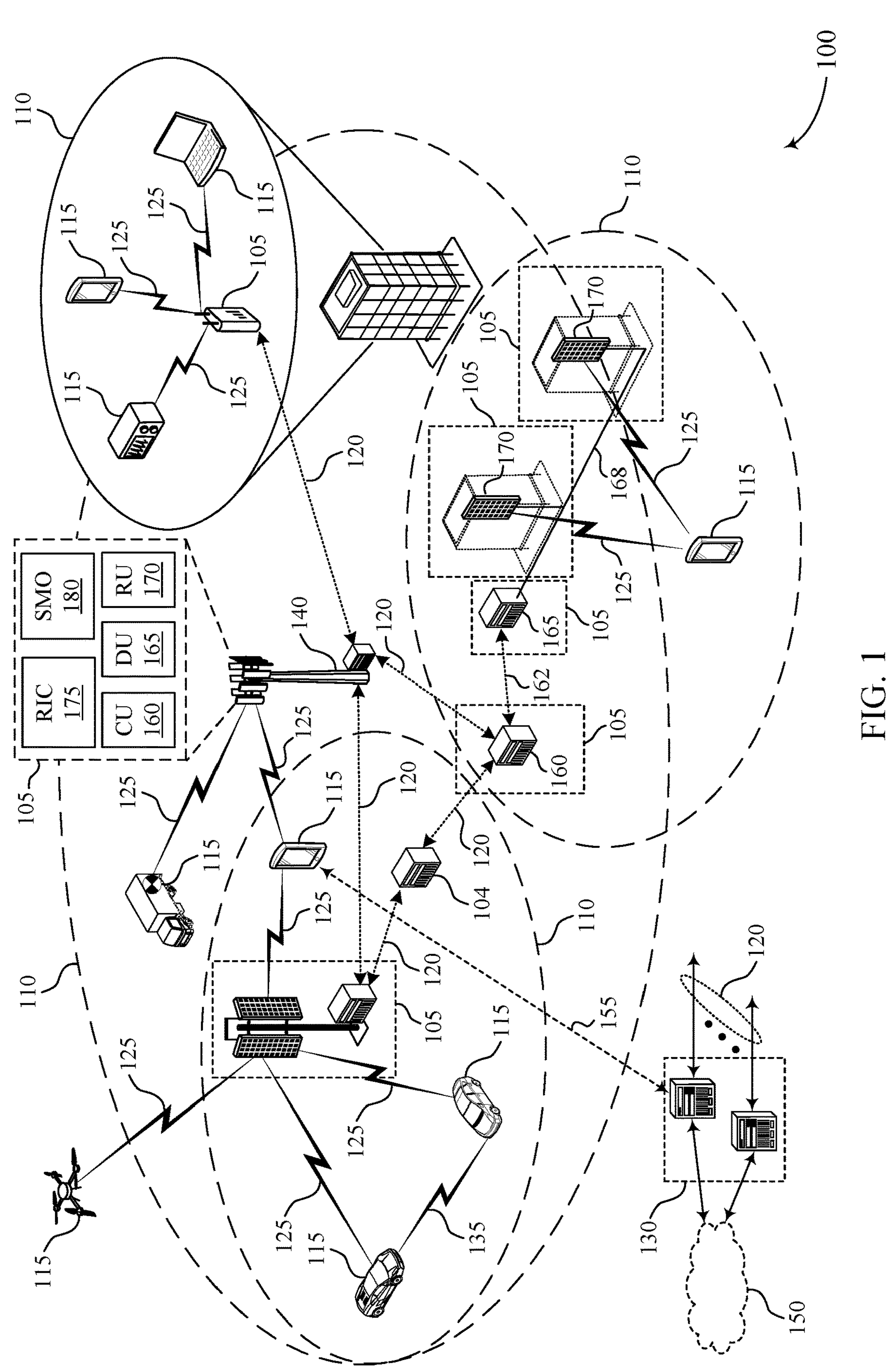
FIG. 1 illustrates an example of a wireless communications system that supports reference signal port association determination for single frequency network (SFN) uplink in accordance with one or more aspects of the present disclosure.

Some wireless communications systems may support single frequency network (SNF) communication schemes.

That is, a wireless device, such as a user equipment (UE), may receive control signaling scheduling transmission of one or more SFN uplink messages, where the one or more SFN messages are associated with a set of demodulation reference signal (DMRS) ports or layers and each DMRS port or layer is transmitted from multiple antenna panels at the UE. Additionally, each panel may be associated with a sounding reference signal (SRS) resource set, where each SRS resource set includes one or more SRS resources.

Additionally, some wireless communications systems may support transmission of phase tracking reference signals (PTRSs). In some cases, a UE may receive control signaling scheduling an uplink transmission associated with one or more SRS resources of an SRS resource set, and the UE may transmit PTRS to support phase noise correction. In the case of uplink transmissions that are based on a single SRS resource set, a UE may determine which time and frequency resources (e.g., of a resource block (RB)) to use for transmission of the PTRS based on a frequency association between one or more DMRS ports and one or more PTRS ports. However, in some cases, a UE may receive control signaling scheduling the UE to transmit one or more uplink messages, such as SFN uplink messages, associated with multiple SRS resource sets. In such cases, the UE may be unable to determine a quantity of PTRS ports associated with each SRS resource set, an association between one or more PTRS ports and one or more DMRS ports, or both, because some techniques for making such determinations may yield conflicting or ambiguous results due to the multiple SRS resource sets.

Accordingly, techniques described herein may enable reference signal port association determination for SFN uplink involving multiple SRS resource sets. For example, a wireless device, such as a UE, may receive first control signaling scheduling transmission of SRSs from multiple SRS resource sets, including at least a first SRS resource set and a second SRS resource set. Further, the UE may receive second control signaling including an indication of one or more SRS resources from the multiple SRS resource sets. Additionally, the second control signaling may schedule transmission of one or more SFN uplink messages based on the indication of the one or more SRS resources. That is each DMRS port of a set of DMRS ports associated with the one or more SFN uplink messages may be transmitted from a set of distinct antenna panels of the UE. In such cases, the UE may determine a frequency resource association between one or more PTRS ports and one or more DMRS ports of the set of DMRS ports based on a port association rule and the indication of the one or more SRS resources. In some cases, the one or more PTRS ports may be associated with the first SRS resource set and the second SRS resource set, while in some other cases, a first set of PTRS ports of the one or more PTRS ports may be associated with the first SRS resource set and a second set of PTRS ports of the one or more PTRS ports may be associated with the second SRS resource set. Additionally, the UE may transmit the one or more SFN uplink messages based on the frequency resource association.

Aspects of the disclosure are initially described in the context of wireless communications systems. Aspects of the disclosure are then described in the context of a resource set configuration, transmit precoding matrix indicator (TPMI) sets, and a process flow. Aspects of the disclosure are further illustrated by and described with reference to apparatus diagrams, system diagrams, and flowcharts that relate to reference signal port association determination for SFN uplink.

FIG. 1 illustrates an example of a wireless communications system 100 that supports reference signal port association determination for SFN uplink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support reference signal port association determination for SFN uplink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, the wireless communications system 100 may support techniques to enable a wireless device, such as a UE 115, to determine a frequency resource association, which may also be referred to as a reference signal port association, for SFN uplink based on a port association rule and an indication of one or more SRS resources. For example, a UE 115 may receive first control signaling scheduling transmission of SRS signals from multiple SRS resource sets, including at least a first SRS resource set and a second SRS resource set. Further, the UE 115 may receive second control signaling including an indication of one or more SRS resources from the multiple SRS resource sets. Additionally, the second control signaling may schedule transmission of one or more SFN uplink messages based on the indication of the one or more SRS resources. The one or more SFN messages may be associated with a set of DMRS ports and each DMRS port of the set of DMRS ports may be transmitted from a set of distinct antenna panels of the UE 115. That is, a first DMRS port of the set of DMRS ports may be transmitted from a first antenna panel of the UE 115 and from a second antenna panel of the UE 115, where the first antenna panel and the second antenna panel are distinct. In some cases, the UE 115 may determine a frequency resource associated between one or more PTRS ports and one or more DMRS ports of the set of DMRS ports based on a port association rule and the indication of the one or more SRS resources. In some cases, the port association rule may be based on one or more parameters at the UE 115 (e.g., pre-configured at the UE 115). Additionally, the UE 115 may transmit the one or more SFN uplink messages based on the frequency resource association.

Figure 2:
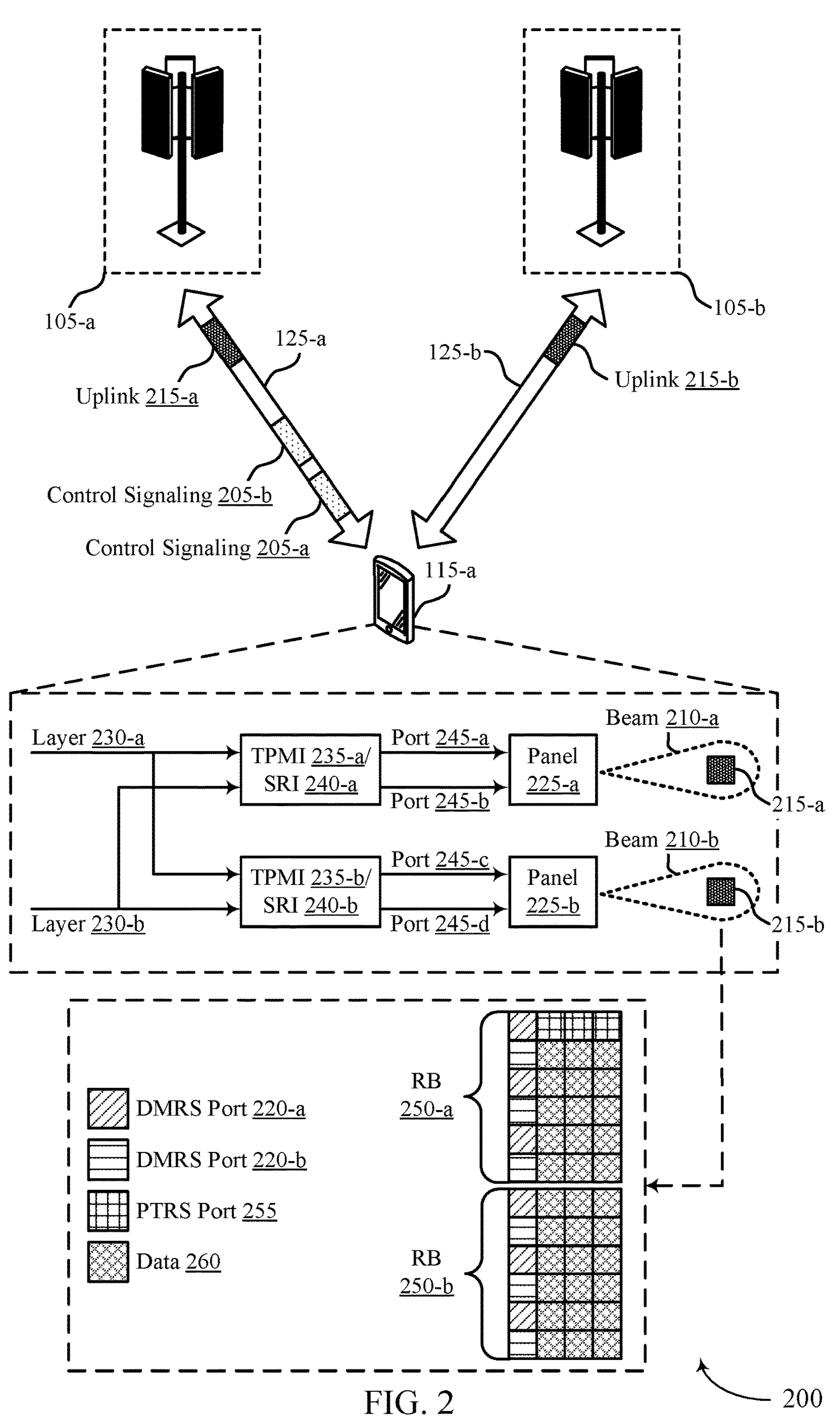
FIG. 2 illustrates an example of a wireless communications system that supports reference signal port association determination for SFN uplink in accordance with one or more aspects of the present disclosure.

FIG. 2 illustrates an example of a wireless communications system 200 that supports reference signal port association determination for SFN uplink in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a* and a network entity 105-*b*) and one or more UEs 115 (e.g., a UE 115-*a*), which may be examples of the corresponding devices described with reference to FIG. 1. In the example of FIG. 2, the network entity 105 *a* may be examples of a CU 160, a DU 165, an RU 170, a base station 140, an IAB node 104, or one or more other network nodes as described with reference to FIG. 1. As described in the example of FIG. 2, techniques are provided for determining a number of PTRS ports and a PTRS-DMRS association in the case of SFN uplink messages that are associated with two or more SRS resource sets. The described techniques include one or more rules (e.g., referred to as port associated rules), which may be statically configured or dynamically indicated to the UE, for determining a PTRS-DMRS association for both codebook (CB) and non-CB (NCB) based uplink transmissions. Furthermore, the described techniques include one or more rules for determining a PTRS-DMRS association for a first scenario where each PTRS port is also transmitted in an SFN manner such that each PTRS is associated with both SRS resource sets, and for a second scenario where each PTRS port is not transmitted in an SFN manner such that one or more PTRS ports are associated with a first SRS resource set while another one or more PTRS ports are associated with the second SRS resource set.

Some wireless communications systems, such as the wireless communications system 200, may support CB and NCB based uplink transmissions (e.g., physical uplink shared channel (PUSCH) transmissions). For CB based transmissions, a wireless device, such as a UE 115, may receive control signaling indicating a configuration associated with one SRS resource set (e.g., with usage set to codebook), where the one SRS resource set may include a maximum quantity of SRS resources (e.g., a maximum of four SRS resources). Additionally, the UE 115 may receive additional control signaling (e.g., downlink control information (DCI)) scheduling an uplink transmission (e.g., PUSCH), where an SRS resource indicator (SRI) field may indicate an SRS resource from the SRS resource set for the UE 115 to perform the uplink transmission. In some cases, the additional control signaling may include an additional field (e.g., precoding information and number of layers field), such as a TPMI field, indicating a quantity of layers (e.g., rank) and TPMI (e.g., precoder) for the uplink transmission.

For NCB based transmissions, a wireless device, such as a UE 115, may receive control signaling indicating a configuration associated with one SRS resource set (e.g., with usage set to non-codebook), where the one SRS resource set may include a maximum quantity of SRS resources (e.g., a maximum of four SRS resources) and each SRS resource may be associated with a single port. Additionally, the UE 115 may receive additional control signaling (e.g., DCI) scheduling an uplink transmission (e.g., PUSCH), where an SRI field may indicate one or more SRS resources from the SRS resource set for the UE 115 to perform the uplink transmission. In some cases, the UE 115 may determine a quantity of layers (e.g., referred to as a rank) for the uplink transmission based on a quantity of indicated SRS resources. Additionally, the UE 115 may transmit the uplink transmission with a precoder that is the same as a precoder associated with the one or more indicated SRS resources.

Additionally, some wireless communications systems may support uplink transmission repetitions using multiple sets of transmission parameters. That is, a UE 115 may receive control signaling (e.g., a single DCI) scheduling multiple uplink transmission repetitions (e.g., time division multiplexed PUSCH repetitions) associated with a transport block (TB), in which each uplink transmission repetition of the multiple uplink transmission repetitions may be associated with a set of uplink transmission repetitions from multiple sets of uplink transmission repetitions, in which each set of uplink transmission repetitions is associated with one or more transmission parameters (e.g., beam index, power control parameters, spatial relation parameter, transmission configuration indicator (TCI) state, precoding, etc.). That is, each set of uplink transmission repetitions of the multiple sets of uplink transmission repetitions may be associated with an SRS resource set, where each SRS resource set is associated with a TRP (e.g., two sets of uplink transmission repetitions correspond to two SRS resource sets).

For example, the UE 115 may receive control signaling scheduling transmission of SRS signals from multiple SRS resource sets, including a first SRS resource set associated with a first TRP and a second SRS resource set associated with a second TRP. In some cases, the UE 115 may receive additional control signaling (e.g., DCI) scheduling multiple uplink transmissions associated with a TB, where the set of uplink transmissions includes a first set of uplink transmissions and a second set of uplink transmissions. Additionally, the additional control signaling may include multiple SRI fields (e.g., for both CB and NCB based transmissions), where each SRI field is associated with a respective set of uplink transmission repetitions, such as a first SRI field associated with the first set of uplink transmissions and a second SRI field associated with the second set of uplink transmissions. Further, each SRI field may be associated with a set of transmission parameters, which may include at least an indication of a beam to be used by the UE 115 for transmission of the respective set of uplink transmissions and a set of power control parameters to be used by the UE 115 for transmission of the respective set of uplink transmissions. For example, a first set of transmission parameters may be associated with the first SRS resource set and a second set of transmission parameters may be associated with the second SRS resource set. In some cases (e.g., CB based uplink transmissions), the additional control signaling may include multiple TPMI fields, each indicating a precoder associated with a respective set of uplink transmissions (e.g., two TPMI fields to indicate two precoders for the two sets of repetitions). As such, the UE 115 may transmit the first set of uplink transmissions to the first TRP associated with the first SRS resource set according to the first set of transmission parameters and the second set of uplink transmissions to the second TRP associated with the second SRS resource set according to the second set of transmission parameters (e.g., in a TDM manner).

Additionally, some wireless communications systems may support an SFN communications scheme. That is, a UE 115 may receive a control message (e.g., single DCI) scheduling one or more uplink transmissions, which may be referred to as SFN uplink messages, according to an SFN communications scheme. That is, each DMRS port (e.g., layer) of a set of DMRS ports associated with the one or more SFN uplink transmissions may be transmitted from a set of distinct antenna panels at the UE 115, where each antenna panel is associated with a set of transmission parameters (e.g., transmit beam, precoder, power control parameters). For example, one or more uplink transmissions may be associated with a set of DMRS ports including a first DMRS port and a second DMRS port. As such, the UE 115 may transmit the first DMRS port via a first antenna panel of a set of antenna panels at the UE 115 and via a second antenna panel of the set of antenna panels at the UE 115. Additionally, the UE 115 may transmit the second DMRS port via the first antenna panel of a set of antenna panels at the UE 115 and via the second antenna panel of the set of antenna panels at the UE 115.

In some cases, a wireless communications system may support transmission of PTRS (e.g., for phase noise correction). That is, a UE 115 may transmit PTRS using one or more resources (e.g., resource elements of one or more RBs), within a set of resources allocated for an uplink transmissions. Specifically, for a given frequency resource, the UE 115 may transmit PTRS in time resources (e.g., OFDM symbols) that are different than the time resources used to transmit DMRS (e.g., PTRS may not be needed in a symbol for phase correction if DMRS is present in that symbol). In some cases, transmission of PTRS may be sparsely spaced in the frequency domain. For example, the UE 115 may transmit one tone per PTRS port according to a spacing in the frequency domain (e.g., one tone per port every 2 or 4 RBs). Transmission of PTRS may be relatively dense in a time domain. For example, the UE 115 may transmit PTRS according to a periodicity in a time domain (e.g., every 1, 2, or 4 OFDM symbols).

In some cases (e.g., NCB based uplink transmissions), the actual quantity of PTRS ports (e.g., in scenarios where the maximum number of PTRS ports is configured to be greater than one) is based on the SRI field. For example, the UE 115 may receive control signaling including one or more SRI fields indicating one or more SRS resources, where each SRS resource is associated (e.g., configured) with a PTRS port (e.g., via a PTRS port index). In some cases, an SRS resource (e.g., indicated via the SRI field) may be associated with an index value that is the same as a PTRS port index value, such that a single PTRS port may be associated with the SRS resource. Alternatively, the SRS resource may be associated with an index value that is different than the PTRS port index value, such that multiple PTRS ports (e.g., two) may be associated with the SRS resource. In some other cases (e.g., CB based uplink transmissions), the UE 115 may determine the quantity of PTRS ports for an uplink transmission based on TPMI.

Additionally, a PTRS port may be associated with a DMRS port, which may be referred to as a port association (or PTRS-DMRS association). This port association is the basis on which the UE 115 determines which resource elements to use for transmitting the PTRS. It may be desirable to transmit PTRS associated with a DMRS port such that the UE 115 may transmit PTRS on a layer associated with signal characteristics above a threshold (e.g., a strong layer) based on an associated DMRS port (e.g., if more than one layer or DMRS port is scheduled).

In some cases, the UE 115 may receive control signaling indicating a configuration associated with PTRS transmission (e.g., RRC configured via an RRC parameter PTRS-UplinkConfig). For example, the configuration may indicate a quantity of ports configured for PTRS (e.g., maxNrofPorts), which may be referred to as PTRS ports. In some cases, the quantity of PTRS ports may be one (e.g., for full-coherent UEs 115) or two (e.g., for a cyclic prefix OFDM waveform). Additionally, the control signaling (e.g., uplink DCI formats 0_1 or 0_2) indicating the configuration may include a port association field (e.g., PTRS-DMRS association field). In some cases, the port association field may be two bits (e.g., if uplink PTRS is configured, cyclic prefix OFDM is used, transform precoder is disabled, and MaxRank>1).

In some cases, the quantity of PTRS ports associated with an uplink transmission may be one (e.g., PTRS port 0 is present). In such case, the UE 115 may determine an association between the PTRS port and a DMRS port (e.g., one of four DMRS ports) based on a value indicated in a port association field of control signaling. That is, the UE 115 may be pre-configured with a port association table which may define one or more associations between one or more values indicated in a port association field and one or more DMRS ports.

In some other cases, the quantity of PTRS ports associated with an uplink transmission may be greater than one (e.g., PTRS port 0 and 1 are present). In such cases, the UE 115 may determine a first association between a first PTRS port (e.g., PTRS port 0) and one or more DMRS ports of a set of DMRS ports associated with the first PTRS port (e.g., out of DMRS ports that are associated with or that "share" PTRS port 0) based on a first bit in a port association field, and the UE 115 may determine a second association between a second PTRS port (e.g., PTRS port 1) and one or more DMRS ports of a set of DMRS ports associated with the second PTRS port (e.g., out of DMRS ports that are associated with or that "share" PTRS port 1) based on a second bit in the port association field.

Additionally, the UE 115 may determine the set of DMRS ports that share the first PTRS port and the set of DMRS ports that share the second PTRS port based on or more rules that depend on whether the transmission is CB or NCB. In some cases (e.g., NCB based uplink transmission), the UE 115 may determine the set of DMRS ports associated with the first PTRS port and the set of DMRS ports associated with the second PTRS port based on an SRI field in a control message scheduling an associated uplink message. That is, the SRI field may indicate one or more SRS resources and each indicated SRS resource may be associated with one or more indicated DMRS ports, where the one or more DMRS ports are indicated via an additional field, such as an antenna ports field, in the control message. Additionally, each SRS resource may be configured with a PTRS port index. For example, the UE 115 may receive a control message indicating a configuration in which a first set of SRS resources (e.g., SRS resources 0, 1) are associated with a first PTRS port (e.g., PTRS port 0) and a second set of SRS resources (e.g., SRS resources 2, 3) are associated with a second PTRS port (e.g., PTRS port 1). Additionally, the control message may include an SRI field indicating the first set of SRS resources and the second set of SRS sources, an antenna port indicating multiple DMRS ports (e.g., DMRS ports 0-3), and a port association field (e.g., PTRS-DMRS port association field) indicating that a first set of DMRS ports from the multiple DMRS ports are associated with the first PTRS port (e.g., DMRS ports 0-1 share PTRS port 0) and a second set of DMRS ports from the multiple DMRS ports are associated with the second PTRS port (e.g., DMRS ports 2-3 share PTRS port 1).

In some other cases (e.g., CB based uplink transmissions), the UE 115 may determine the set of DMRS ports associated with the first PTRS port and the set of DMRS ports associated with the second PTRS port based on a TPMI in a control message scheduling an associated uplink message (e.g., for partial-coherent or non-coherent UEs 115). For example, a first set of uplink antenna ports (e.g., PUSCH antenna port 1000 and 1002) indicated in a TPMI may be associated with the first PTRS port (e.g., PTRS port 0) and a second set of uplink antenna ports (e.g., PUSCH antenna port 1001 and 1003) indicated in the TPMI may be associated with the second PTRS port (e.g., PTRS port 1). Additionally, a first set of DMRS ports may be associated with the first set of uplink antenna ports and a second set of DMRS ports may be associated with the second set of uplink antenna ports. That is, the first set of DMRS ports may correspond to one or more layers that are transmitted with the first set of antenna ports and the second set of DMRS ports may correspond to one or more layers that are transmitted with the second set of antenna ports. As such, the first set of DMRS ports may be associated with the first PTRS port and the second set of DMRS ports may be associated with the second PTRS port. For example, a control message may include a TPMI field indicating a set of layers (e.g., three layers) and a TPMI index (e.g., TPMI index of two) and an antenna ports field indicating multiple DMRS ports corresponding to the set of layers, such that a first DMRS port is associated with a first layer of the set of layers, a second DMRS port is associated with a second layer of the set of layers, and a third DMRS port is associated with a third layer of the set of layers. Additionally, a first layer may be transmitted via a first set of antenna ports (e.g., PUSCH antenna ports 1000 and 1002) associated with a first PTRS port, a second layer may be transmitted via a second set of antenna ports (e.g., PUSCH antenna port 1001) associated with a second PTRS port, and a third layer may be transmitted via a third set of antenna ports (e.g., PUSCH antenna port 1003) associated with the second PTRS port. As such, the first DMRS port may be associated with the first PTRS port and the second DMRS port and the third DMRS port may be associated with the second PTRS port.

However, in some cases, such as SFN communications, a UE 115 may receive control signaling indicating multiple SRS resource sets associated with an uplink message, such as an SFN uplink message. That is, each DMRS port (e.g., layer) associated with the SFN uplink message may be associated with the multiple SRS resource sets and multiple precoding matrices may be indicated via multiple SRI fields (e.g., in the case of NCB based uplink) or via multiple TPMIs (e.g., in the case of CB based uplink). For example, each SRI field of the multiple SRI fields may indicate one or more SRS resources from corresponding SRS resource sets of the multiple SRS resource sets (e.g., a same quantity of SRS resources within a first SRS resource set of the multiple resource sets and a second resource set of the multiple resource sets may be indicated by two SRI fields, where the same quantity corresponds to a quantity of layers or DMRS ports). In another example, each TPMI of the multiple TPMIs may indicate a same quantity of layers, which may correspond to a quantity of columns of each TPMI matrix (e.g., a quantity of uplink ports, or quantity of rows of each TPMI matrix, may be the same or may be different and a codebook subset configured via codebookSubset{{fullyAndPartialAndNonCoherent,partialAndNonCoherent,noncoherent}} of each TPMI of the multiple TPMIs may be the same or may be different). In such cases, the UE 115 may be unable to determine a quantity of PTRS ports associated with the uplink message and a port association between the quantity of PTRS ports and one or more DMRS ports associated with the uplink message.

Accordingly, techniques described herein may enable a wireless device, such as a UE 115-*a*, to determine one or more reference signal port associations for SFN uplink. For example, the UE 115-*a* may communicate with a network entity 105-*a* via a communication link 125-*a* and with a network entity 105-*b* via a communication link 125-*b*. In some cases, the UE 115-*a* may receive control signaling 205-*a* scheduling transmission of SRS from multiple SRS resource sets, including at least a first SRS resource set associated with a beam 210-*a* (e.g., and a first TCI state) and a second SRS resource set associated with a beam 210-*b* (e.g., and a second TCI state). Further, the UE 115-*a* may receive control signaling 205-*b* including an indication of one or more resource allocations for the SFN uplink messages, such as RB 250-*a* and RB 250-*b*. Additionally, the control signaling 205-*b* may schedule transmission of one or more SFN uplink messages, such as an uplink message 215-*a* and an uplink message 215-*b*.

In such cases, each DMRS port 220 of a set of DMRS ports 220 associated with the uplink messages 215 may be transmitted from a set of antenna panels 225. For example, the DMRS port 220-*a* may be associated with a layer 230-*a* and the DMRS port 220-*b* may be associated with a layer 230-*b*. Additionally, a TPMI 235-*a* or an SRI 240-*a* may be associated with the first resource set and a TPMI 235-*b* or an SRI 240-*b* may be associated with the second resource set. As such, the layer 230-*a* may be transmitted via a port 245-*a*, which may be an uplink port 245 (e.g., PUSCH port 245), from a panel 225-*a* associated with the first SRS resource set and via a port 245-*c* from a panel 225-*b* associated with the second SRS resource set. Additionally, the layer 230-*b* may be transmitted via a port 245-*b* from the panel 225-*a* associated with the first SRS resource set and via a port 245-*d* from the panel 225-*b* associated with the second SRS resource set. That is, the UE 115-*a* may transmit, to the network entity 105-*a*, the uplink message 215-*a* via the beam 210-*a* from the panel 225-*a* and transmit, to the network entity 105-*b*, the uplink message 215-*b* via the beam 210-*b* from the panel 225-*b*, where the uplink message 215-*a* and the uplink message 215-*b* each include the layer 230-*a* and the layer 230-*b*.

Additionally, the UE 115-*a* may determine a frequency resource association between one or more PTRS ports 255 and one or more DMRS ports 220, such as the DMRS port 220-*a* and the DMRS port 220-*b*, based on a port association rule and the indication of the one or more SRS resource sets. In some cases, a maximum quantity of PTRS ports 255 for the UE 115-*a* may be one (e.g., the UE 115-*a* does not expect to be configured with maxNPorts=2 for PTRS for SFN PUSCH). In this example, since there is only one PTRS port 255 configured, the UE 115-*a* may determine the frequency resource association between a PTRS port 255 and one more DMRS ports 220 based on a value indicated in the control signaling 205-*b*. That is, the control signaling 205-*b* may indicate a value corresponding to a DMRS port 220, such as the DMRS port 220-*a*, and the UE 115-*a* may determine the frequency resource association between the PTRS port 255 and the DMRS port 220-*a* based on the value and a table indicating an association between a single PTRS port 255 and multiple DMRS ports 220.

Additionally, the control signaling 205-*b* may indicate an RB 250-*a*, such that the DMRS port 220-*a* and the PTRS port 255 are associated with a same frequency resource in the RB 250-*a*. In the example of FIG. 2, a frequency density of PTRS may be every two RBs 250 and a time density of PTRS may be every non-DMRS symbol. Additionally, the RB 250-*a* and the RB 250-*b* may carry data 260 (e.g., uplink data 260).

In some other cases, a maximum quantity of PTRS ports 255 for the UE 115-*a* may be greater than one. In this example, since there are multiple PTRS ports 255, the UE 115-*a* may determine the frequency resource association between the PTRS ports 255 and one more DMRS ports 220 based on a port association rule and the indication of the one or more SRS resource sets, as described in more detail with reference to FIGS. 3 and 4.

Additionally, or alternatively, a first set of one or more PTRS ports 255 may be associated with the first SRS resource set and a second set of one or more PTRS ports 255 may be associated with the second SRS resource set, where the first set and the second set are different (e.g., PRTS-DMRS association is per SRS resource set). For example, a first PTRS port 255 (e.g., PTRS port 0) may be associated with the DMRS port 220-*a* and the first SRS resource set and a second PTRS port 255 (e.g., PTRS port 1) may be associated with the DMRS port 220-*b* and the second SRS resource set (e.g., one PTRS port 255 per SRS resource set). In such cases, the DMRS port 220-*a* and the DMRS port 220-*b* may be associated with both the first SRS resource set and the second SRS resource set. In some cases, for each PTRS port 255, the UE 115 may use an associated DMRS port 220 to determine a resource element offset for the respective PTRS port 255 (e.g., as well as whether the PTRS port 255 is associated with the first SRS resource set or the second SRS resource set).

In some cases, a maximum quantity of PTRS ports 255 for a UE 115 may be set to two or more (e.g., up to four). In such cases, a quantity of PTRS ports 255 associated with the first SRS resource set may be based on the TPMI 235-*a* (e.g., for CB) or the SRI 240-*a* (e.g., for NCB) and a quantity of PTRS ports 255 associated with the second SRS resource set may be based on the TPMI 235-*b* (e.g., for CB) or the SRI 240-*b* (e.g., for NCB)

In some cases (e.g., maxRank=2), a first bit of a port association field may indicate which of the DMRS ports 220 is associated with a first PTRS port 255 (e.g., PTRS port 0 which is associated with the first SRS resource set) and a second bit of the port association field may indicate which of the DMRS ports 220 is associated with a second PTRS port 255 (e.g., PTRS port 1 which is associated with the second SRS resource set). In some other cases (e.g., maxRank>2), a first port association field (e.g., 2 bits) may indicate which DMRS port 220 is associated with each PTRS port 255 for the first SRS resource set and a second port association field (e.g., 2 bits) may indicate which DMRS port 220 is associated with each PTRS port 255 for the second SRS resource set.

While much of the present disclosure is described in the context of a UE 115 determining one or more reference signal port associations, this is not to be regarded as a limitation of the present disclosure. In this regard, a network entity 105 may perform the functions described herein to determine one or more reference signal port associations in addition to or alternatively to associations between PTRS and DMRS.

Figure 3:
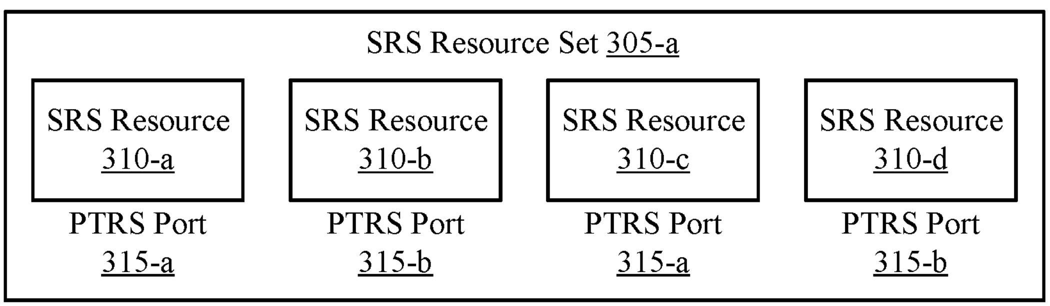
FIG. 3 illustrates an example of a resource set configuration that supports reference signal port association determination for SFN uplink in accordance with one or more aspects of the present disclosure.
Figure 3:
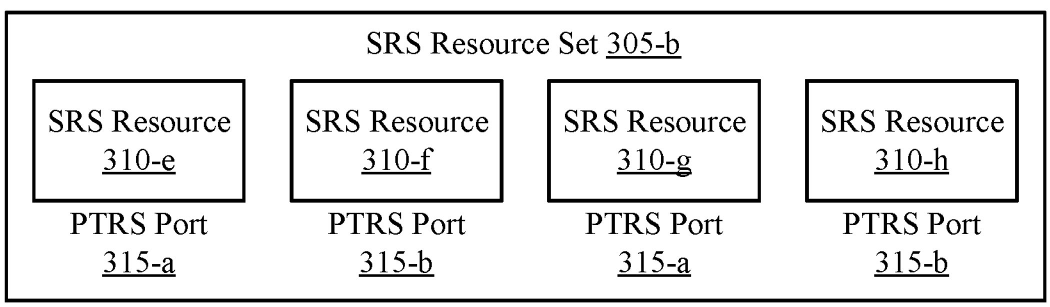

FIG. 3 illustrates an example of a resource set configuration 300 that supports reference signal port association determination for SFN uplink in accordance with one or more aspects of the present disclosure. In some examples, the resource set configuration 300 may implement or be implemented by aspects of the wireless communications system 100 and the wireless communications system 200. For example, the resource set configuration 300 may be implemented by one or more network entities 105 and one or more UEs 115, which may be examples of the corresponding devices described with reference to FIG. 1. In some cases, a UE 115 may determine a frequency resource association between one or more PTRS ports 315 and one or more DMRS ports based on a port association rule and one or more indicated SRS resources 310 from an SRS resource set 305-*a*, an SRS resource set 305-*b*, or both.

In some cases, a UE 115 may receive first control signaling scheduling transmission of SRSs from multiple SRS resource sets, including at least an SRS resource set 305-*a* and an SRS resource set 305-*b*. Further, the UE 115 may receive second control signaling including an indication of one or more SRS resources 310 from the SRS resource set 305-*a*, the SRS resource set 305-*b*, or both. Additionally, the second control signaling may schedule one or more SFN uplink messages (e.g., NCB based uplink messages). The UE 115 may determine a frequency resource association between one or more PTRS ports 315 and one or more DMRS ports based on a port association rule and the one or more indicated SRS resources 310 from the SRS resource set 305-*a*, the SRS resource set 305-*b*, or both.

In some cases, each PTRS port 315 may be associated with the SRS resource set 305-*a* and the SRS resource set 305-*b* (e.g., transmitted in an SFN manner) and a maximum quantity of PTRS ports 315 for the UE 115 may be greater than 1 (i.e., maxNrofPorts=2). Additionally, each SRS resource 310 in the SRS resource set 305-*a* or in the SRS resource set 305-*b* may be associated with either a PTRS port 315-*a* or a PTRS port 315-*b*. Further, a first SRI field in the second control signaling may indicate a quantity of SRS resources 310 from the SRS resource set 315-*a* and a second SRI field in the second control signaling may indicate a quantity of SRS resources 310 from the SRS resource set 315-*b*.

In some cases, the port association rule may indicate that matching SRS resource indices of the SRS resource set 305-*a* and the SRS resource set 305-*b* have a same PTRS port index. As such, in this first example of the port association rule, the UE 115 may expect that the i'th indicated SRS resource (e.g., the first indicated SRS resource) from the first SRS resource set 305-*a* is configured with the same PTRS port index as the i'th indicated SRS resource (e.g., the first indicated SRS resource set) from the second SRS resource set 305-*b*. For example, the first SRI field in the second control signaling may indicate an SRS resource 310-*a* (e.g., associated with a first index) and an SRS resource 310-*b* (e.g., associated with a second index) from the SRS resource set 305-*a* and the second SRI field in the second control signaling may indicate an SRS resource 310-*e* (e.g., associated with the first index) and an SRS resource 310-*h* (e.g., associated with the second index). As such, the SRS resource 310-*a* and the SRS resource 310-*e* may be associated with a same PTRS port index which may correspond to a PTRS port 315-*a*. Additionally, the SRS resource 310-*b* and the SRS resource 310-*h* may be associated with a same PTRS port index which may correspond to a PTRS port 315-*b*.

In another example, the first SRI field in the second control signaling may indicate the SRS resource 310-*a*, the SRS resource 310-*b*, an SRS resource 310-*c*, and an SRS resource 310-*d* from the SRS resource set 305-*a*, and the second SRI field in the second control signaling may indicate the SRS resource 310-*e*, an SRS resource 310-*f*, an SRS resource 310-*g*, and the SRS resource 310-*h*. As such, the SRS resource 310-*a* and the SRS resource 310-*e* may be associated with a same PTRS port index which may correspond to the PTRS port 315-*a*, the SRS resource 310-*b* and the SRS resource 310-*f* may be associated with a same PTRS port index which may correspond to the PTRS port 315-*b*, the SRS resource 310-*c* and the SRS resource 310-*g* may be associated with a same PTRS port index which may correspond to the PTRS port 315-*a*, and the SRS resource 310-*d* and the SRS resource 310-*h* may be associated with a same PTRS port index which may correspond to the PTRS port 315-*b*. That is, a first and a third DMRS port may be associated with PTRS port 315-*a* and a second and a fourth DMRS port may be associated with the PTRS port 315-*b* (e.g., PTRS-DMRS association field in the DCI indicates "10" such that PTRS port 315-*a*, or PTRS port 0, is associated with a third scheduled DMRS based on a most significant bit in the PTRS-DMRS association field being 1 and PTRS port 315-*b*, or PTRS port 0, is associated with a second scheduled DMRS port based on a least significant bit in the PTRS-DMRS association field being 0).

Additionally, or alternatively, the UE 115 may determine a quantity of PTRS ports 315 and the frequency resource association based on one or more SRS resource 310 from the SRS resource set 305-*a* indicated in the first SRI field of the second control signaling, where the SRS resource set 305-*a* is associated with a lower SRS resource set identifier than the SRS resource set 305-*b* (e.g., the UE 115 ignores a PTRS port index configured for SRS resources 310 from the SRS resource set 305-*b* or the UE 115 does not expect the SRS resources 310 from the SRS resource set 305-*b* to be configured with a PTRS port index). For example, the first SRI field in the second control signaling may indicate the SRS resource 310-*a* and the SRS resource 310-*b*, such that the UE 115 determines the quantity of PTRS ports 315 and the frequency resource association based on a PTRS port index for the SRS resource 310-*a* (e.g., associated with PTRS port 315-*a*) and a PTRS port index for the SRS resource 310-*b* (e.g., associated with PTRS port 315-*b*). In another example, the first SRI field in the second control signaling may indicate the SRS resource 310-*a*, the SRS resource 310-*b*, the SRS resources 310-*c* and the SRS resources 310-*d*, such that the UE 115 determines the quantity of PTRS ports 315 and the frequency resource association based on a PTRS port index for the SRS resource 310-*a* (e.g., associated with PTRS port 315-*a*), a PTRS port index for the SRS resource 310-*b* (e.g., associated with PTRS port 315-*b*), a PTRS port index for the SRS resource 310-*c* (e.g., associated with PTRS port 315-*a*), a PTRS port index for the SRS resource 310-*d* (e.g., associated with PTRS port 315-*b*).

Additionally, or alternatively, the UE 115 may determine a quantity of PTRS ports 315 and the frequency resource association based on a first quantity of PTRS ports 315 associated with indicated (e.g., via the first SRI field) SRS resources 310 from the SRS resource set 305-*a*, a second quantity of PTRS ports 315 associated with indicated (e.g., via the second SRI field) SRS resources 310 from the SRS resource set 305-*b*, or both. That is, the UE 115 may determine which of the indicated SRS resources 310 from the SRS resource set 305-*a* or the indicated SRS resources 310 from the SRS resource set 305-*b* may result in a larger or smaller (which may be configured for the UE 115) quantity of PTRS ports 315. In some cases, the UE 115 may determine a quantity of PTRS ports 315 and the frequency resource association based on the indicated SRS resources 310 from the SRS resource set 305-*a*, where the first quantity of PTRS ports 315 is less than the second quantity of PTRS ports 315. Alternatively, the UE 115 may determine a quantity of PTRS ports 315 and the frequency resource association based on the indicated SRS resources 310 from the SRS resource set 305-*a*, where the first quantity of PTRS ports 315 is greater than the second quantity of PTRS ports 315. For example, the first SRI field in the second control signaling may indicate the SRS resource 310-*a* and the SRS resource 310-*b* from the SRS resource set 305-*a* and the second SRI field in the second control signaling may indicate the SRS resource 310-*e* and the SRS resource 310-*h*. In such cases, the UE 115 may determine the SRS resources 310-*a* and the SRS resources 310-*b* are associated with two PTRS ports 315 and the SRS resource 310-*e* and the SRS resource 310-*h* are associated with two PTRS ports. As such, the UE 115 may determine the quantity of PTRS ports 315 and the frequency resource association based on the SRS resource 310-*a* and the SRS resource 310-*b* or the SRS resource 310-*e* and the SRS resource 310-*h*.

FIGS. 4A and 4B illustrates examples of TPMI sets 400, including a TPMI set 400-*a* and a TPMI set 400-*b*, that supports reference signal port association determination for SFN uplink in accordance with one or more aspects of the present disclosure. In some examples, the TPMI sets 400 may implement or be implemented by aspects of the wireless communications system 100, the wireless communications system 200, and the resource set configuration 300. For example, the TPMI sets 400 may be implemented by one or more network entities 105 and one or more UEs 115, which may be examples of the corresponding devices described with reference to FIG. 1. In some cases, a UE 115 may determine a frequency resource association between one or more PTRS ports and one or more DMRS ports based on a port association rule and one or more indicated SRS resources from a first SRS resource set, a second SRS resource set, or both.

In some cases, a UE 115 may receive first control signaling scheduling transmission of SRSs from multiple SRS resource sets, including at least a first SRS resource set and a second SRS resource set. Further, the UE 115 may receive second control signaling including an indication of one or more SRS resources from the first SRS resource set, the second SRS resource set, or both. Additionally, the second control signaling may schedule one or more SFN uplink messages (e.g., CB based uplink messages). The UE 115 may determine a frequency resource association between one or more PTRS ports and one or more DMRS ports based on a port association rule and the one or more indicated SRS resources from the first SRS resource set, the second SRS resource set, or both. In some cases, each PTRS port may be associated with the first SRS resource set and the second SRS resource set (e.g., transmitted in an SFN manner) and a maximum quantity of PTRS ports for the UE 115 is greater than 1.

In some cases, the port association rule indicates that port sharing associations between DMRS ports and PTRS port indices as indicated in a TPMI 405 (e.g., TPMI matrix) are common across multiple TPMIs 405 associated with the one or more SFN uplink messages. That is, a first TPMI 405 associated with the first SRS resource set and a second TPMI 405 associated with the second SRS resource set, may both indicate that a first set of DMRS ports share a first PTRS port (e.g., PTRS port 0) corresponding to layers 410 transmitted by a first port 415 and a third port 415 (e.g., PUSCH ports 1000 and 1002) and a second set of DMRS ports share a second PTRS port (e.g., PTRS port 1) corresponding to layers 410 transmitted by a second port 415 and a fourth port 415 (PUSCH ports 1001 and 1003). In such cases, the UE 115 may determine a quantity of PTRS ports and the frequency resource association based on the first TPMI 405 or the second TPMI 405.

Additionally, or alternatively, the UE 115 may determine the frequency resource association between one or more DMRS ports and one or more PTRS ports based on a selection of a first TPMI 405, such as the TPMI 405-*a*, or a second TPMI 405, such as the TPMI 405-*b*. That is, the UE 115 may determine the quantity of PTRS ports and the frequency resource association based on a selected TPMI 405 from the TPMI 405-*a* or the TPMI 405-*b* (e.g., according to a port association field in the selected TPMI 405). In some cases, the UE 115 may select a TPMI 405 based on a lowest SRS resource set identifier associated with the TPMI 405. That is, the UE 115 may select the TPMI 405-*a* based on an SRS resource set identifier associated with the TPMI 405-*a* being less than an SRS resource set identifier associated with the TPMI 405-*b*. For example, as depicted in FIG. 4A, the TPMI 405-*a* (e.g., non-coherent), associated with the first SRS resource set and a first SRS resource set identifier, and the TPMI 405-*b* (e.g., partial-coherent), associated with the second SRS resource set and a second SRS resource set identifier, may each be associated with four ports 415, which may be uplink (e.g., PUSCH) ports 415, including a port 415-*a* (e.g., PUSCH port 1000), a port 415-*b* (e.g., PUSCH port 1001), a port 415-*c* (e.g., PUSCH port 1002), and a port 415-*d* (e.g., PUSCH port 1003). Additionally, the TPMI 405-*a* and the TPMI 405-*b* may each be associated with three layers 410 (e.g., corresponding to three DMRS ports), including a layer 410-*a* (e.g., a first layer), a layer 410-*b* (e.g., a second layer), and a layer 410-*c* (e.g., a third layer). Based on the TPMI 405-*a*, a first DMRS port corresponding to the layer 410-*a* and a third DMRS port corresponding to the layer 410-*c* may be associated with (e.g., share) a first PTRS port (e.g., PTRS port 0) and a second DMRS port corresponding to the layer 410-*b* may be associated with a second PTRS port (e.g., PTRS port 1). Based on the TPMI 405-*b*, the first DMRS port may be associated with the first PTRS port and the second DMRS port and third DMRS port may be associated with the second PTRS port. Therefore, a port association for the TPMI 405-*a* may be different than a port association for the TPMI 405-*b* (e.g., not common). As such, the UE 115 may determine the quantity of PTRS ports and the frequency resource association based on the TPMI 405-*a* based on the first SRS resource set identifier being less than the second SRS resource set identifier.

In some cases, the UE 115 may select a TPMI 405 based on a quantity of PTRS ports resulting from the TPMI 405. For example, as depicted in FIG. 4B, a TPMI 405-*c* (e.g., non-coherent), associated with the first SRS resource set, and a TPMI 405-*d* (e.g., partial-coherent), associated with the second SRS resource set, may each be associated with four ports 415, which may be uplink (e.g., PUSCH) ports 415, including the port 415-*a*, the port 415-*b*, the port 415-*c*, and the port 415-*d*. Additionally, the TPMI 405-*c* and the TPMI 405-*d* may each be associated with two layers 410 (e.g., corresponding to two DMRS ports), including the layer 410-*a* and the layer 410-*b*. Based on the TPMI 405-*c*, the first DMRS port corresponding to the layer 410-*a* may be associated with (e.g., share) the first PTRS port (e.g., PTRS port 0) and the second DMRS port corresponding to the layer 410-*b* may be associated with the second PTRS port (e.g., PTRS port 1). Based on the TPMI 405-*d*, the first DMRS port and the second DMRS port may be associated with the first PTRS port. Therefore, a port association for the TPMI 405-*c* may be different than a port association for the TPMI 405-*d*. As such, the UE 115 may determine the quantity of PTRS ports and the frequency resource association based on a quantity of PTRS ports resulting from the TPMI 405-*c* and a quantity of PTRS ports resulting from the TPMI 405-*d*. In some cases, the UE 115 may determine the quantity of PTRS ports and the frequency resource association based on the TPMI 405-*c* based on the quantity of PTRS ports resulting from the TPMI 405-*c* (e.g., two PTRS ports) being greater than the quantity of PTRS ports resulting from the TPMI 405-*d* (e.g., one PTRS ports). Alternatively, the UE 115 may determine the quantity of PTRS ports and the frequency resource association based on the TPMI 405-*d* based on the quantity of PTRS ports resulting from the TPMI 405-*d* being less than the quantity of PTRS ports resulting from the TPMI 405-*c*.

In some cases, the UE 115 may select a TPMI 405 based on a codebook subset associated with the TPMI 405. That is, the UE 115 may select the TPMI 405 based on the TPMI 405 being associated with a codebook subset indicating a partial-coherent TPMI 405 or a non-coherent TPMI 405. In some cases, the UE 115 may select a TPMI 405 based quantity of ports 415 associated with the TPMI 405. That is, the UE 115 may select the TPMI 405 of a set of TPMIs 405 associated with the largest or smallest quantity of ports 415 (e.g., quantity of rows in the TPMI 405 matrix).

Figure 5:
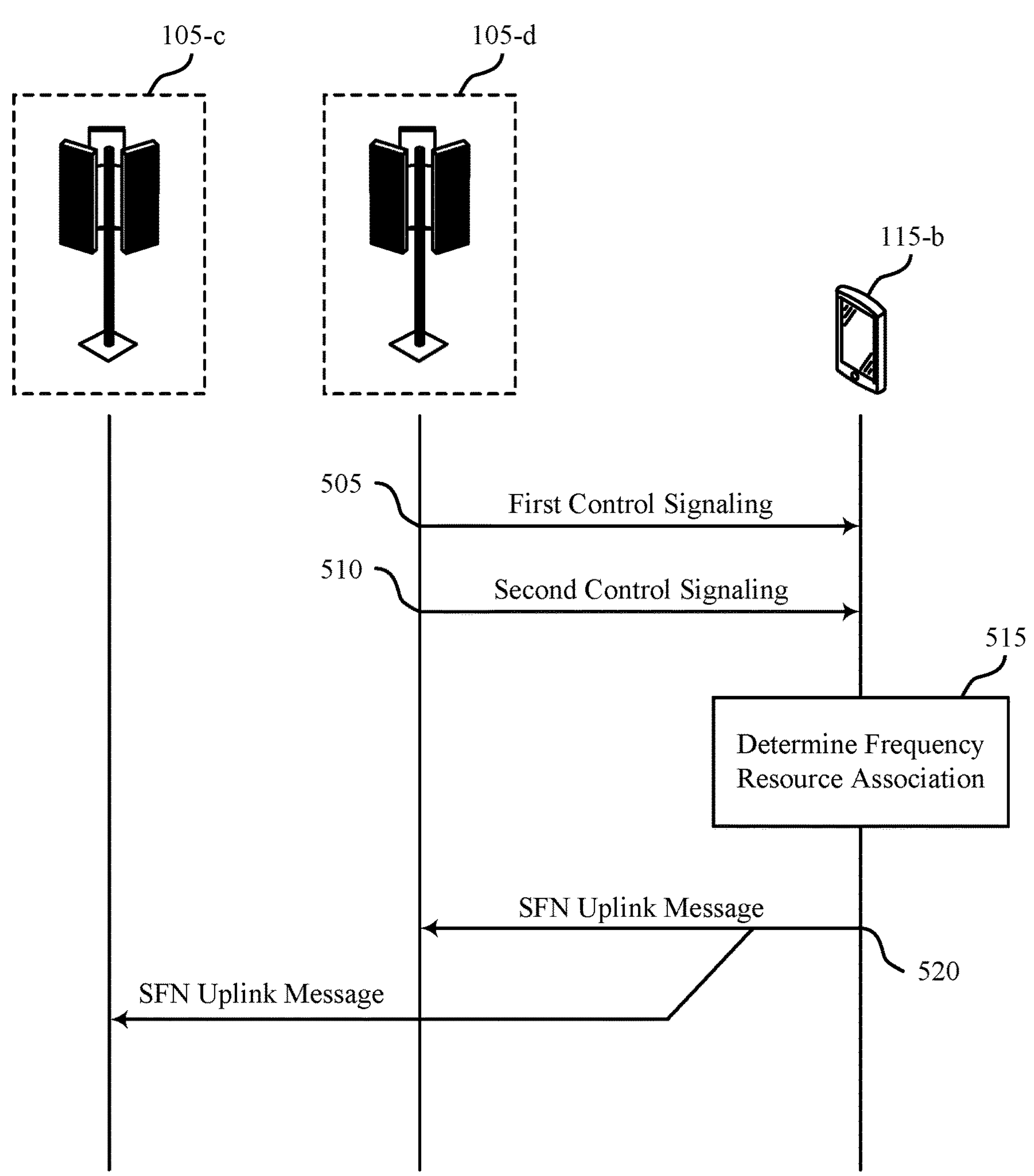
FIG. 5 illustrates an example of a process flow that supports reference signal port association determination for SFN uplink in accordance with one or more aspects of the present disclosure.

FIG. 5 illustrates an example of a process flow 500 that supports reference signal port association determination for SFN uplink in accordance with one or more aspects of the present disclosure. In some examples, the process flow 500 may implement or be implemented by aspects of the wireless communications system 100, the wireless communications system 200, the resource set configuration 300, and the TPMI sets 400. For example, the process flow 500 may include one or more network entities 105 (e.g., a network entity 105-*c* and a network entity 105-*d*) and one or more UEs 115 (e.g., a UE 115-*b*), which may be examples of the corresponding devices described with reference to FIG. 1. In the example of FIG. 5, the network entity 105 *a* may be examples of a CU 160, a DU 165, an RU 170, a base station 140, an IAB node 104, or one or more other network nodes as described with reference to FIG. 1. For example, the UE 115-*b* may determine a frequency resource association based on a port association rule and an indication of one or more SRS resources.

At 505, the UE 115-*b* may receive, from a network entity 105, such as the network entity 105-*d*, first control signaling scheduling transmission of SRS signals from multiple SRS resource sets, including at least a first SRS resource set and a second SRS resource set. In some cases, a maximum quantity of PTRS ports for the UE 115-*b* may be one (e.g., restricted to one). In some other cases, the maximum quantity of PTRS ports for the UE 115-*b* may be greater than one. Additionally, or alternatively, the SFN uplink messages may be CB based messages or NCB based messages.

At 510, the UE 115-*b* may receive, from a network entity 105, such as the network entity 105-*d*, second control signaling including an indication of one or more SRS resources from the multiple SRS resource sets and scheduling transmission of one or more SFN uplink messages based on the indication of the one or more SRS resources, wherein each DMRS port of a set of DMRS ports associated with the one or more SFN uplink messages are transmitted from a set of distinct antenna panels of the UE 115-*b*. In some cases, the second control signaling may include an indication of a value corresponding to one DMRS port of the set of DMRS ports.

At 515, the UE 115-*b* may determine a frequency resource association between one or more PTRS ports and one or more DMRS ports of the set of DMRS ports based on a port association rule and the indication of one or more SRS resources.

In some cases, the port association rule may indicate that matching SRS resources indices of the first SRS resource set and the second SRS resource set have a same PTRS port index. In such cases, the UE 115-*b* may determine the frequency resource association between the one or more DMRS ports and the one or more PTRS ports based on one or more SRS resources from the first SRS resource set or from the second SRS resource set.

In some cases, the UE 115-*b* may determine the frequency resource association between the one or more DMRS ports and the one or more PTRS ports is based on one or more indicated SRS resources from either the first SRS resource set or the second SRS resource set having a lowest SRS resource set identifier.

In some cases, the indication of the one or more SRS resources from the plurality of SRS resource sets includes a first indication of one or more SRS resources from the first SRS resource set that results in a first quantity of PTRS ports and a second indication of one or more SRS resources from the second SRS resource set that results in a second quantity of PTRS ports. In such cases, the UE 115-*b* may determine the frequency resource association between the one or more DMRS ports and the one or more PTRS ports based on the first quantity of PTRS ports, the second quantity of PTRS ports, or both. In some cases, the UE 115-*b* may determine the frequency resource association between the one or more DMRS ports and the one or more PTRS ports is based on either the one or more indicated SRS resources from the first SRS resource set or the one or more indicated SRS resources from the second SRS resource set resulting in a greater quantity of PTRS ports. In some cases, the UE 115-*b* may determine the frequency resource association between the one or more DMRS ports and the one or more PTRS ports is based on either the one or more indicated SRS resources from the first SRS resource set or the one or more indicated SRS resources from the second SRS resource set resulting in a lesser quantity of PTRS ports In some cases, the port association rule may indicate that sharing associations between DMRS ports and PTRS port indices as indicated in a TPMI are common across a set of TPMIs associated with the one or more SFN uplink messages. In such cases, the UE 115-*b* may determine the frequency resource association between the one or more DMRS ports and the one or more PTRS ports based on a first TPMI associated with the first SRS resource set or from a second TPMI associated with the second SRS resource set.

In some cases, the indication of the one or more SRS resources from multiple SRS resource sets includes a first indication of a first TPMI and a second indication of a second TPMI. In such cases, the UE 115-*b* may determine the frequency resource association between the one or more DMRS ports and the one or more PTRS ports based on a selection of the first TPMI or the second TPMI according to a TPMI selection criteria. In some examples, the TPMI selection criteria may be based on a lowest SRS resource set identifier associated with either the first TPMI or the second TPMI. In some examples, the TPMI selection criteria may be based on a quantity of PTRS ports resulting from the first TPMI or the second TPMI. In some examples, the TPMI selection criteria may be based on a codebook subset associated with the first TPMI and the second TPMI, where the codebook subset indicates a partial-coherent TPMI or a non-coherent TPMI. In some examples, the TPMI selection criteria may be based on a quantity of uplink (e.g., PUSCH) ports associated with the first TPMI and the second TPMI.

In some cases, the UE 115-*b* may determine the frequency resource association between the one or more DMRS ports and a PTRS port of the one or more PTRS ports based on the value indicated in the second control signaling and a table indicating an association between a single PTRS port and the set of DMRS ports.

In some cases, the port association rule may indicate that a first set of one or more PTRS ports are associated with the first SRS resource set and a second set of one or more PTRS ports are associated with the first SRS resource set, where the first set of one or more PTRS ports is different than the second set of one or more PTRS ports.

In some cases, the UE 115-*b* may determine a first quantity of PTRS ports associated with the first SRS resource set based on the indication of the one or more SRS resources and a second quantity of PTRS ports associated with the second SRS resource set based on the indication of the one or more SRS resources.

In some cases, the indication of the one or more SRS resources may include a first bit indicating a first PTRS port index and a second bit indicating a second PTRS port index. In such cases, the UE 115-*b* may determine the first PTRS port index is associated with the first SRS resource set based on the first bit and the second PTRS port index is associated with the second SRS resource set based on the second bit.

In some cases, the indication of the one or more SRS resources includes a first set of bits indicating a first set of one or more PTRS port indices and a second set of bits indicating a second set of one or more PTRS port indices. In such cases, the UE 115-*b* may determine each PTRS index of the first set of one or more PTRS port indices is associated with a respective DMRS port based on the first set of bits, where the first set of bits is associated with the first SRS resource set. Additionally, the UE 115-*b* may determine each PTRS index of the second set of one or more PTRS port indices is associated with a respective DMRS port based on the second set of bits, wherein the second set of bits is associated with the second SRS resource set.

At 520, the UE 115-*b* may transmit, to the network entity 105-*c* and the network entity 105-*d*, the one or more SFN uplink messages based on the frequency resource association.

Figure 6:
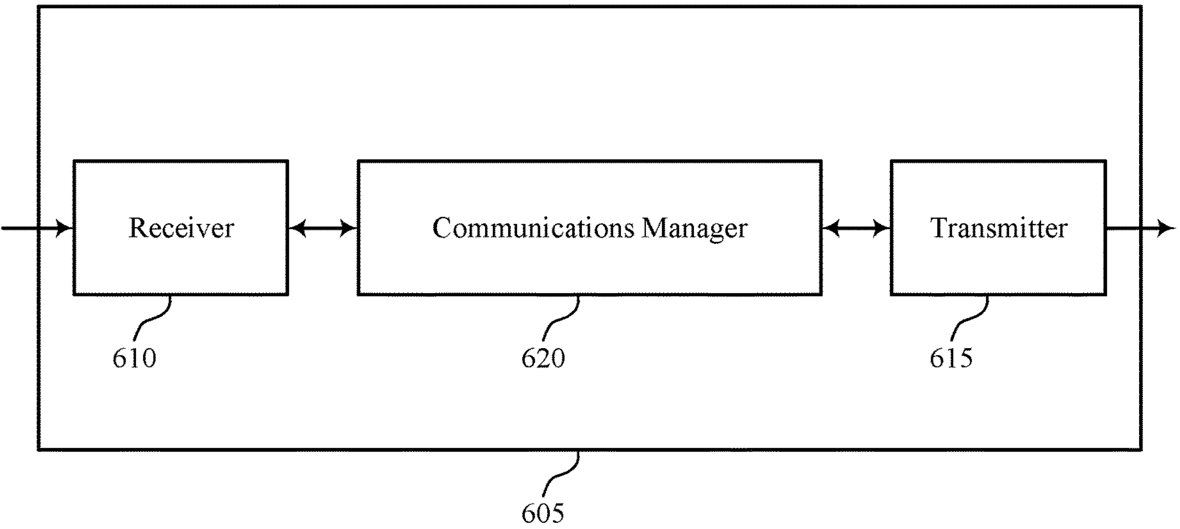
FIGS. 6 and 7 show block diagrams of devices that support reference signal port association determination for SFN uplink in accordance with one or more aspects of the present disclosure.

FIG. 6 shows a block diagram 600 of a device 605 that supports reference signal port association determination for SFN uplink in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reference signal port association determination for SFN uplink). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reference signal port association determination for SFN uplink). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reference signal port association determination for SFN uplink as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving first control signaling scheduling transmission of SRSs from a set of multiple SRS resource sets, including at least a first SRS resource set and a second SRS resource set. The communications manager 620 may be configured as or otherwise support a means for receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE. The communications manager 620 may be configured as or otherwise support a means for determining a frequency resource association between one or more PTRS ports and one or more DMRS ports of the set of multiple DMRS ports based on a port association rule and the indication of one or more SRS resources. The communications manager 620 may be configured as or otherwise support a means for transmitting the one or more SFN uplink messages based on the frequency resource association.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reference signal port association determination for single frequency network SFN uplink, which may result in reduced processing, reduced power consumption, and more efficient utilization of communication resources, among other advantages.

Figure 7:
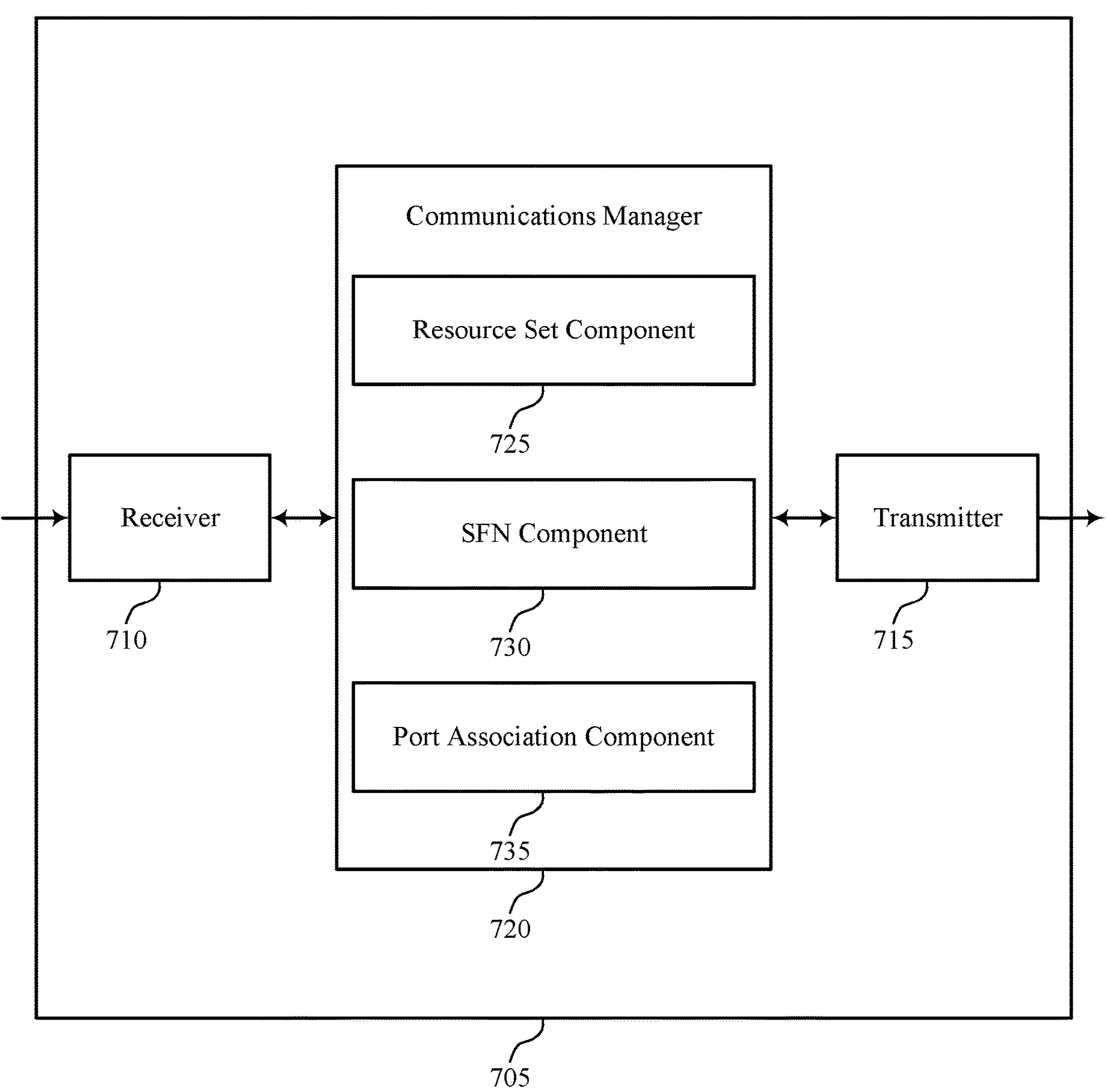

FIG. 7 shows a block diagram 700 of a device 705 that supports reference signal port association determination for SFN uplink in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reference signal port association determination for SFN uplink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reference signal port association determination for SFN uplink). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reference signal port association determination for SFN uplink as described herein. For example, the communications manager 720 may include a resource set component 725, an SFN component 730, a port association component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The resource set component 725 may be configured as or otherwise support a means for receiving first control signaling scheduling transmission of SRSs from a set of multiple SRS resource sets, including at least a first SRS resource set and a second SRS resource set. The SFN component 730 may be configured as or otherwise support a means for receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE. The port association component 735 may be configured as or otherwise support a means for determining a frequency resource association between one or more PTRS ports and one or more DMRS ports of the set of multiple DMRS ports based on a port association rule and the indication of one or more SRS resources. The SFN component 730 may be configured as or otherwise support a means for transmitting the one or more SFN uplink messages based on the frequency resource association.

Figure 8:
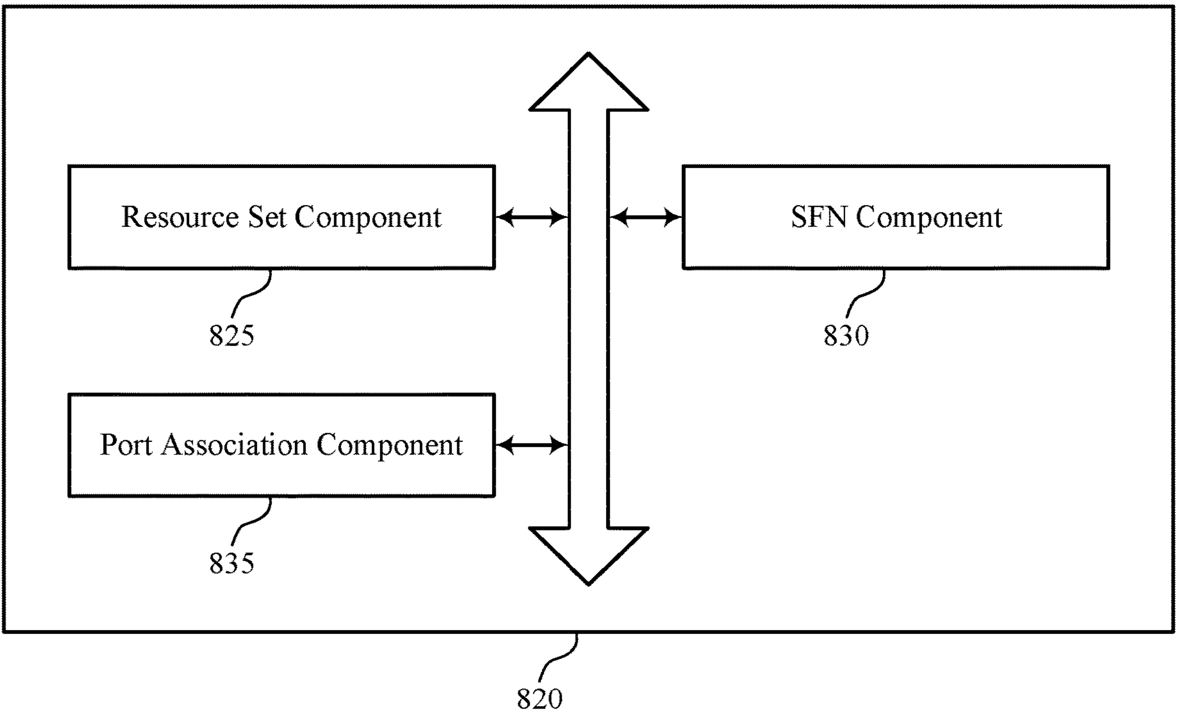
FIG. 8 shows a block diagram of a communications manager that supports reference signal port association determination for SFN uplink in accordance with one or more aspects of the present disclosure.

FIG. 8 shows a block diagram 800 of a communications manager 820 that supports reference signal port association determination for SFN uplink in accordance with one or more aspects of the present disclosure. The communications manager 820 may be an example of aspects of a communications manager 620, a communications manager 720, or both, as described herein. The communications manager 820, or various components thereof, may be an example of means for performing various aspects of reference signal port association determination for SFN uplink as described herein. For example, the communications manager 820 may include a resource set component 825, an SFN component 830, a port association component 835, or any combination thereof. Each of these components may communicate, directly or indirectly, with one another (e.g., via one or more buses).

The communications manager 820 may support wireless communications at a UE in accordance with examples as disclosed herein. The resource set component 825 may be configured as or otherwise support a means for receiving first control signaling scheduling transmission of SRSs from a set of multiple SRS resource sets, including at least a first SRS resource set and a second SRS resource set. The SFN component 830 may be configured as or otherwise support a means for receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE. The port association component 835 may be configured as or otherwise support a means for determining a frequency resource association between one or more PTRS ports and one or more DMRS ports of the set of multiple DMRS ports based on a port association rule and the indication of one or more SRS resources. In some examples, the SFN component 830 may be configured as or otherwise support a means for transmitting the one or more SFN uplink messages based on the frequency resource association.

In some examples, a maximum quantity of PTRS ports for the UE is greater than one. In some examples, the one or more SFN uplink messages are non-codebook based messages. In some examples, the port association rule indicates that matching SRS resources indices of the first SRS resource set and the second SRS resource set have a same PTRS port index. In some examples, determining the frequency resource association between the one or more DMRS ports and the one or more PTRS ports is based on one or more SRS resources from the first SRS resource set or from the second SRS resource set.

In some examples, a maximum quantity of PTRS ports for the UE is greater than one. In some examples, the one or more SFN uplink messages are non-codebook based messages. In some examples, determining the frequency resource association between the one or more DMRS ports and the one or more PTRS ports is based on one or more indicated SRS resources from either the first SRS resource set or the second SRS resource set having a lowest SRS resource set identifier.

In some examples, a maximum quantity of PTRS ports for the UE is greater than one. In some examples, the one or more SFN uplink messages are non-codebook based messages. In some examples, the indication of the one or more SRS resources from the set of multiple SRS resource sets includes a first indication of one or more SRS resources from the first SRS resource set that results in a first quantity of PTRS ports and a second indication of one or more SRS resources from the second SRS resource set that results in a second quantity of PTRS ports. In some examples, determining the frequency resource association between the one or more DMRS ports and the one or more PTRS ports is based on the first quantity of PTRS ports, the second quantity of PTRS ports, or both.

In some examples, determining the frequency resource association between the one or more DMRS ports and the one or more PTRS ports is based on either the one or more indicated SRS resources from the first SRS resource set or the one or more indicated SRS resources from the second SRS resource set resulting in a greater quantity of PTRS ports.

In some examples, determining the frequency resource association between the one or more DMRS ports and the one or more PTRS ports is based on either the one or more indicated SRS resources from the first SRS resource set or the one or more indicated SRS resources from the second SRS resource set resulting in a lesser quantity of PTRS ports.

In some examples, a maximum quantity of PTRS ports for the UE is greater than one. In some examples, the one or more SFN uplink messages are codebook based messages. In some examples, the port association rule indicates that sharing associations between DMRS ports and PTRS port indices as indicated in a transmit precoding matrix are common across a set of multiple transmit precoding matrices associated with the one or more SFN uplink messages. In some examples, determining the frequency resource association between the one or more DMRS ports and the one or more PTRS ports is based on a first transmit precoding matrix associated with the first SRS resource set or from a second transmit precoding matrix associated with the second SRS resource set.

In some examples, a maximum quantity of PTRS ports for the UE is greater than one. In some examples, the one or more SFN uplink messages are codebook based messages. In some examples, the indication of the one or more SRS resources from the set of multiple SRS resource sets includes a first indication of a first transmit precoding matrix and a second indication of a second transmit precoding matrix. In some examples, determining the frequency resource association between the one or more DMRS ports and the one or more PTRS ports is based on a selection of the first transmit precoding matrix or the second transmit precoding matrix based on a transmit precoding matrix selection criteria.

In some examples, the transmit precoding matrix selection criteria is based on a lowest SRS resource set identifier associated with either the first transmit precoding matrix or the second transmit precoding matrix.

In some examples, the transmit precoding matrix selection criteria is based on a quantity of PTRS ports resulting from the first transmit precoding matrix or the second transmit precoding matrix.

In some examples, the transmit precoding matrix selection criteria is based on a codebook subset associated with the first transmit precoding matrix and the second transmit precoding matrix. In some examples, the codebook subset indicates a partial-coherent transmit precoding matrix or a non-coherent transmit precoding matrix.

In some examples, the transmit precoding matrix selection criteria is based on a quantity of physical uplink shared channel ports associated with the first transmit precoding matrix and the second transmit precoding matrix.

In some examples, to support receiving the second control signaling, the port association component 835 may be configured as or otherwise support a means for receiving an indication of a value corresponding to one DMRS port of the set of multiple DMRS ports, where determining the frequency resource association between the one or more DMRS ports and a PTRS port of the one or more PTRS ports is based on the value and a table indicating an association between a single PTRS port and the set of multiple DMRS ports.

In some examples, the port association rule indicates that a first set of one or more PTRS ports are associated with the first SRS resource set and a second set of one or more PTRS ports are associated with the first SRS resource set. In some examples, the first set of one or more PTRS ports is different than the second set of one or more PTRS ports.

In some examples, to support determining the frequency resource association between the one or more DMRS ports and the one or more PTRS ports, the port association component 835 may be configured as or otherwise support a means for determining a first quantity of PTRS ports associated with the first SRS resource set based on the indication of the one or more SRS resources. In some examples, to support determining the frequency resource association between the one or more DMRS ports and the one or more PTRS ports, the port association component 835 may be configured as or otherwise support a means for determining a second quantity of PTRS ports associated with the second SRS resource set based on the indication of the one or more SRS resources.

In some examples, to support determining the frequency resource association between the one or more PTRS ports and the one or more DMRS ports of the set of multiple DMRS ports, the port association component 835 may be configured as or otherwise support a means for determining the first PTRS port index is associated with the first SRS resource set based on the first bit. In some examples, to support determining the frequency resource association between the one or more PTRS ports and the one or more DMRS ports of the set of multiple DMRS ports, the port association component 835 may be configured as or otherwise support a means for determining the second PTRS port index is associated with the second SRS resource set based on the second bit.

In some examples, to support determining the frequency resource association between the one or more PTRS ports and the one or more DMRS ports of the set of multiple DMRS ports, the port association component 835 may be configured as or otherwise support a means for determining each PTRS index of the first set of one or more PTRS port indices is associated with a respective DMRS port based on the first set of bits, where the first set of bits is associated with the first SRS resource set. In some examples, to support determining the frequency resource association between the one or more PTRS ports and the one or more DMRS ports of the set of multiple DMRS ports, the port association component 835 may be configured as or otherwise support a means for determining each PTRS index of the second set of one or more PTRS port indices is associated with a respective DMRS port based on the second set of bits, where the second set of bits is associated with the second SRS resource set.

Figure 9:
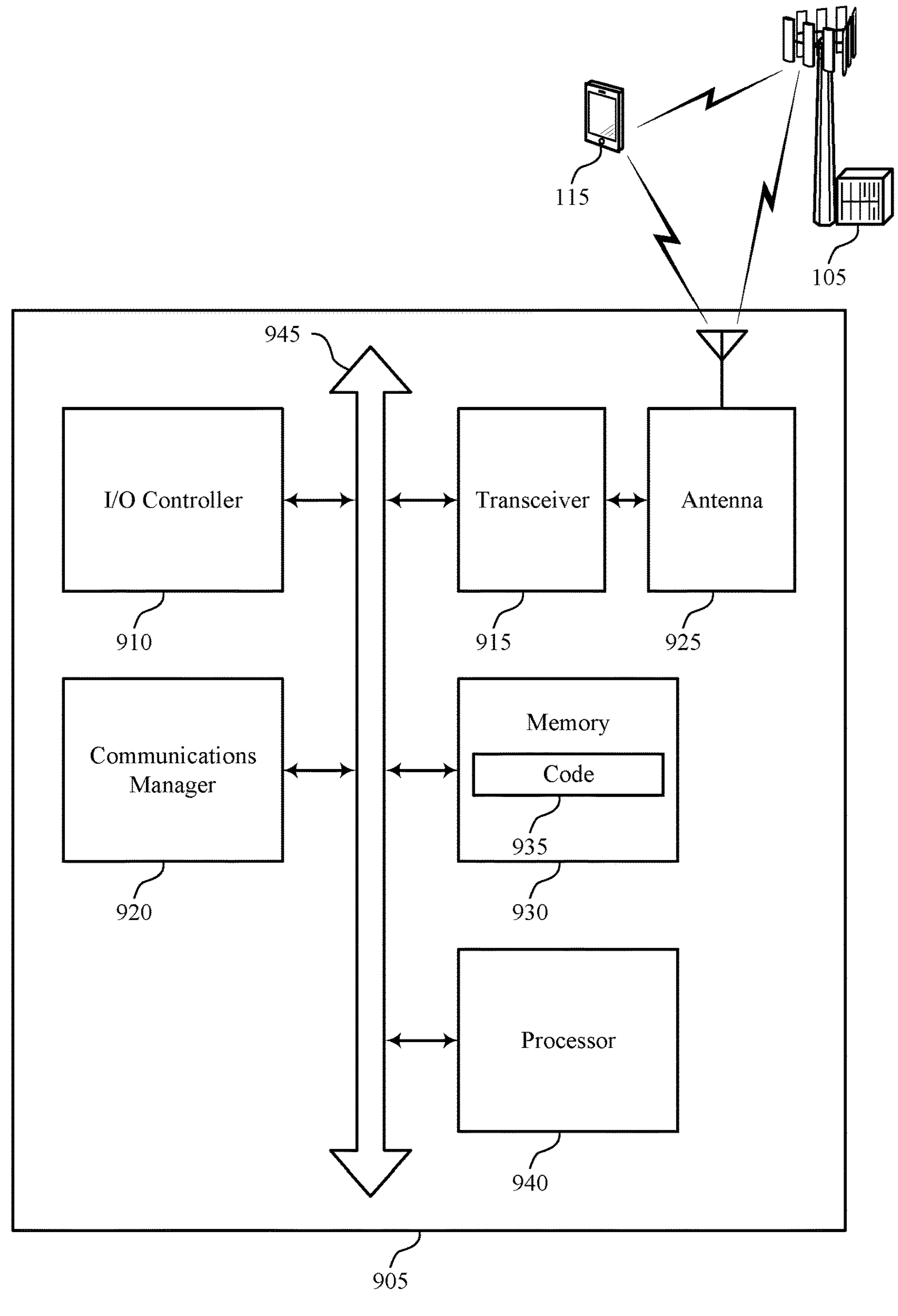
FIG. 9 shows a diagram of a system including a device that supports reference signal port association determination for SFN uplink in accordance with one or more aspects of the present disclosure.

FIG. 9 shows a diagram of a system 900 including a device 905 that supports reference signal port association determination for SFN uplink in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reference signal port association determination for SFN uplink). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving first control signaling scheduling transmission of SRSs from a set of multiple SRS resource sets, including at least a first SRS resource set and a second SRS resource set. The communications manager 920 may be configured as or otherwise support a means for receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE. The communications manager 920 may be configured as or otherwise support a means for determining a frequency resource association between one or more PTRS ports and one or more DMRS ports of the set of multiple DMRS ports based on a port association rule and the indication of one or more SRS resources. The communications manager 920 may be configured as or otherwise support a means for transmitting the one or more SFN uplink messages based on the frequency resource association.

By including or configuring the communications manager 920 in accordance with examples as described herein, the device 905 may support techniques for reference signal port association determination for single frequency network SFN uplink, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reference signal port association determination for SFN uplink as described herein, or the processor 940 and the memory 930 may be otherwise configured to perform or support such operations.

Figure 10:
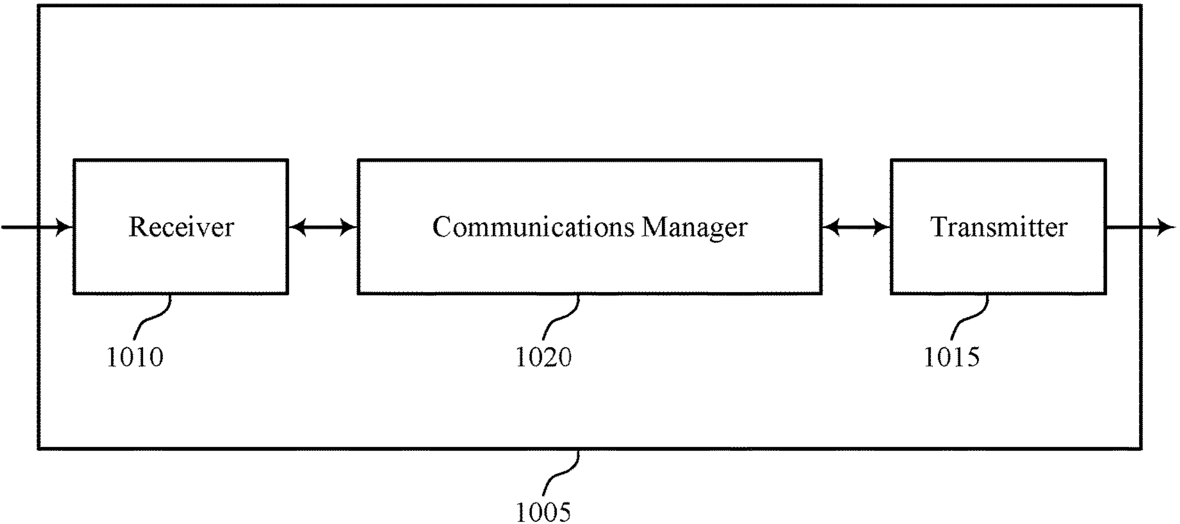
FIGS. 10 and 11 show block diagrams of devices that support reference signal port association determination for SFN uplink in accordance with one or more aspects of the present disclosure.

FIG. 10 shows a block diagram 1000 of a device 1005 that supports reference signal port association determination for SFN uplink in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of reference signal port association determination for SFN uplink as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting first control signaling scheduling transmission of SRSs from a set of multiple SRS resource sets, including at least a first SRS resource set and a second SRS resource set. The communications manager 1020 may be configured as or otherwise support a means for outputting second control signaling including an indication of one or more SRS resources from the set of multiple SRS resource sets and scheduling transmission of one or more SFN uplink messages based on the indication of the one or more SRS resources. The communications manager 1020 may be configured as or otherwise support a means for determining a frequency resource association between one or more PTRS ports and one or more DMRS ports of a set of multiple DMRS ports based on a port association rule and the indication of one or more SRS resources. The communications manager 1020 may be configured as or otherwise support a means for receiving the one or more SFN uplink messages based on the port association rule.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reference signal port association determination for single frequency network SFN uplink, which may result in reduced processing, reduced power consumption, and more efficient utilization of communication resources, among other advantages.

Figure 11:
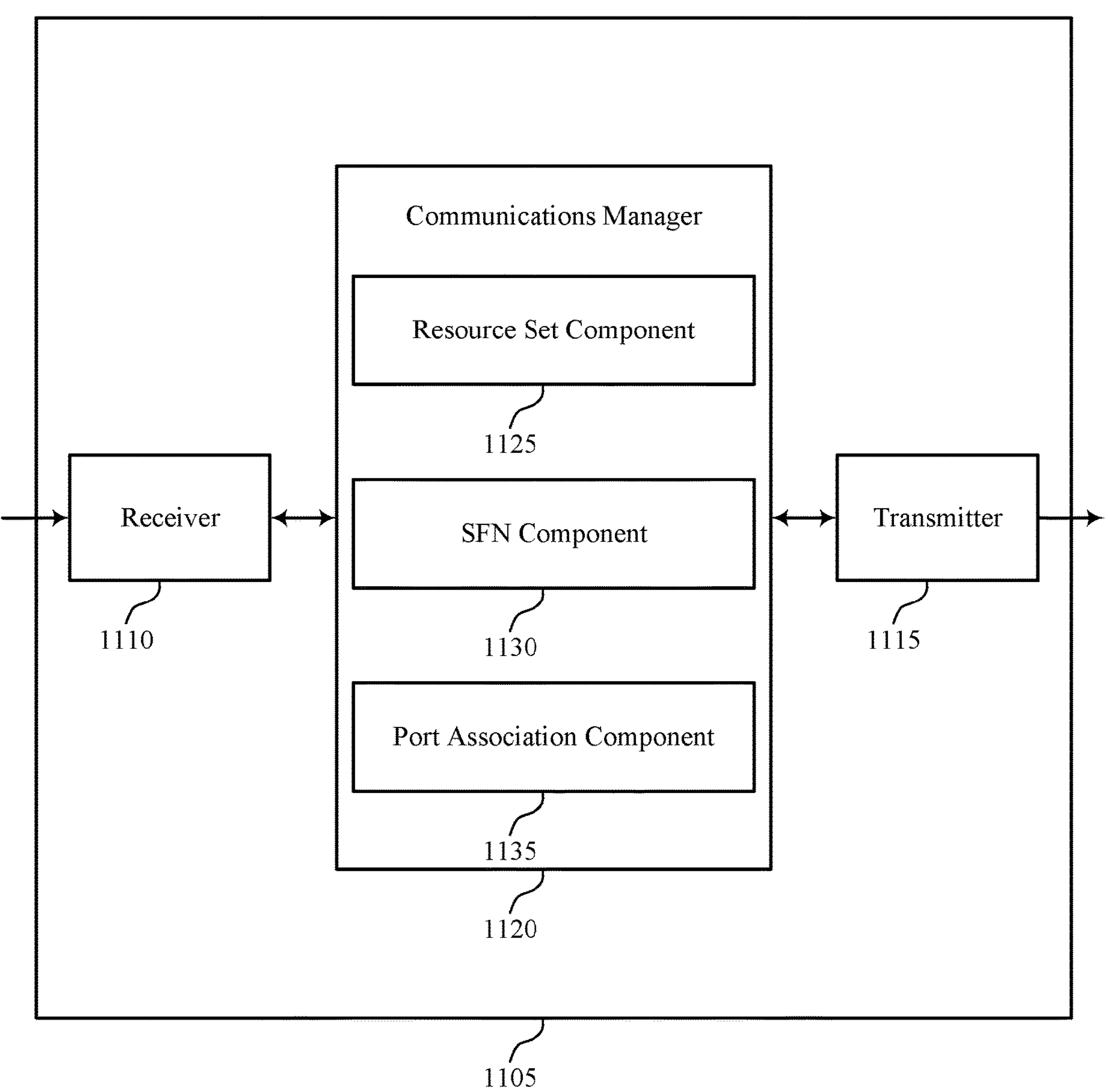

FIG. 11 shows a block diagram 1100 of a device 1105 that supports reference signal port association determination for SFN uplink in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of reference signal port association determination for SFN uplink as described herein. For example, the communications manager 1120 may include a resource set component 1125, an SFN component 1130, a port association component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The resource set component 1125 may be configured as or otherwise support a means for outputting first control signaling scheduling transmission of SRSs from a set of multiple SRS resource sets, including at least a first SRS resource set and a second SRS resource set. The SFN component 1130 may be configured as or otherwise support a means for outputting second control signaling including an indication of one or more SRS resources from the set of multiple SRS resource sets and scheduling transmission of one or more SFN uplink messages based on the indication of the one or more SRS resources. The port association component 1135 may be configured as or otherwise support a means for determining a frequency resource association between one or more PTRS ports and one or more DMRS ports of a set of multiple DMRS ports based on a port association rule and the indication of one or more SRS resources. The SFN component 1130 may be configured as or otherwise support a means for receiving the one or more SFN uplink messages based on the port association rule.

Figure 12:
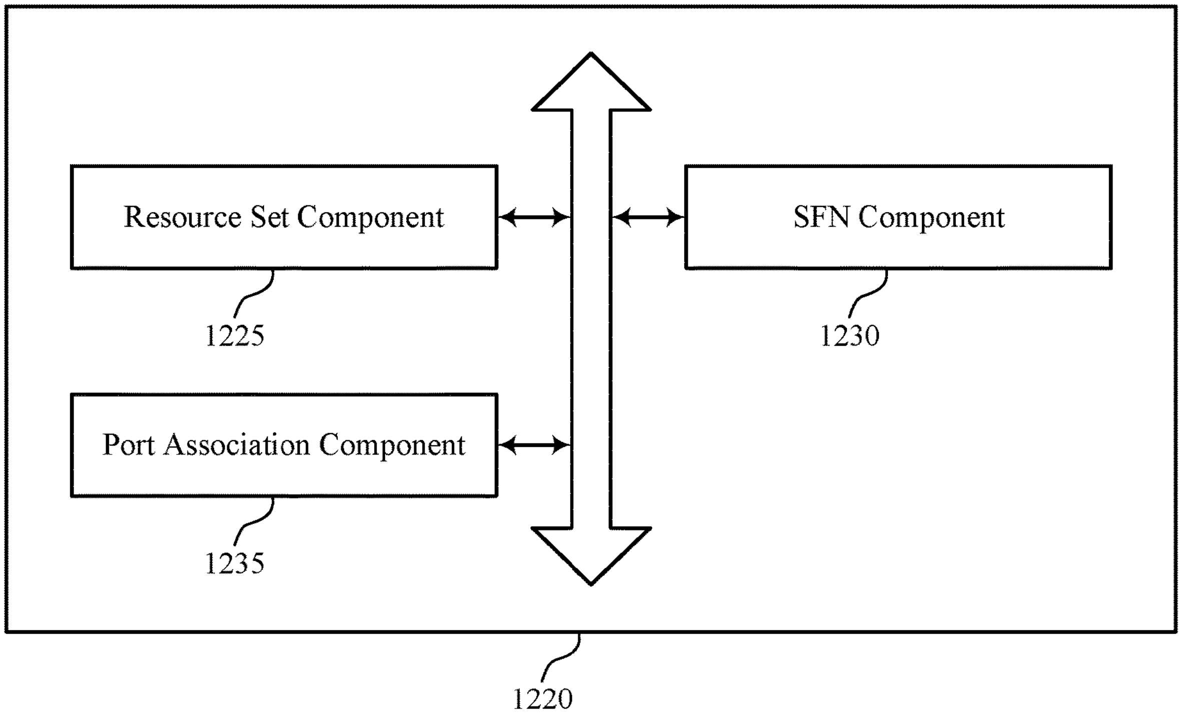
FIG. 12 shows a block diagram of a communications manager that supports reference signal port association determination for SFN uplink in accordance with one or more aspects of the present disclosure.

FIG. 12 shows a block diagram 1200 of a communications manager 1220 that supports reference signal port association determination for SFN uplink in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of reference signal port association determination for SFN uplink as described herein. For example, the communications manager 1220 may include a resource set component 1225, an SFN component 1230, a port association component 1235, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The resource set component 1225 may be configured as or otherwise support a means for outputting first control signaling scheduling transmission of SRSs from a set of multiple SRS resource sets, including at least a first SRS resource set and a second SRS resource set. The SFN component 1230 may be configured as or otherwise support a means for outputting second control signaling including an indication of one or more SRS resources from the set of multiple SRS resource sets and scheduling transmission of one or more SFN uplink messages based on the indication of the one or more SRS resources. The port association component 1235 may be configured as or otherwise support a means for determining a frequency resource association between one or more PTRS ports and one or more DMRS ports of a set of multiple DMRS ports based on a port association rule and the indication of one or more SRS resources. In some examples, the SFN component 1230 may be configured as or otherwise support a means for receiving the one or more SFN uplink messages based on the port association rule.

In some examples, a maximum quantity of PTRS ports for a UE is greater than one. In some examples, the one or more SFN uplink messages are non-codebook based messages. In some examples, the port association rule indicates that matching SRS resources indices of the first SRS resource set and the second SRS resource set have a same PTRS port index.

In some examples, a maximum quantity of PTRS ports for a UE is greater than one. In some examples, the one or more SFN uplink messages are non-codebook based messages. In some examples, determining the frequency resource association between the one or more DMRS ports and the one or more PTRS ports is based on one or more indicated SRS resources from either the first SRS resource set or the second SRS resource set having a lowest SRS resource set identifier.

In some examples, a maximum quantity of PTRS ports for a UE is greater than one. In some examples, the one or more SFN uplink messages are non-codebook based messages. In some examples, the indication of the one or more SRS resources from the set of multiple SRS resource sets includes a first indication of one or more SRS resources from the first SRS resource set that results in a first quantity of PTRS ports and a second indication of one or more SRS resources from the second SRS resource set that results in a second quantity of PTRS ports. In some examples, determining the frequency resource association between the one or more DMRS ports and the one or more PTRS ports is based on the first quantity of PTRS ports, the second quantity of PTRS ports, or both.

In some examples, determining the frequency resource association between the one or more DMRS ports and the one or more PTRS ports is based on either the one or more indicated SRS resources from the first SRS resource set or the one or more indicated SRS resources from the second SRS resource set resulting in a greater quantity of PTRS ports.

In some examples, determining the frequency resource association between the one or more DMRS ports and the one or more PTRS ports is based on either the one or more indicated SRS resources from the first SRS resource set or the one or more indicated SRS resources from the second SRS resource set resulting in a lesser quantity of PTRS ports.

In some examples, a maximum quantity of PTRS ports for a UE is greater than one. In some examples, the one or more SFN uplink messages are codebook based messages. In some examples, the port association rule indicates that sharing associations between DMRS ports and PTRS port indices as indicated in a transmit precoding matrix are common across a set of multiple transmit precoding matrices associated with the one or more SFN uplink messages. In some examples, determining the frequency resource association between the one or more DMRS ports and the one or more PTRS ports is based on a first transmit precoding matrix associated with the first SRS resource set or from a second transmit precoding matrix associated with the second SRS resource set.

In some examples, a maximum quantity of PTRS ports for a UE is greater than one. In some examples, the one or more SFN uplink messages are codebook based messages. In some examples, the indication of the one or more SRS resources from the set of multiple SRS resource sets includes a first indication of a first transmit precoding matrix and a second indication of a second transmit precoding matrix. In some examples, determining the frequency resource association between the one or more DMRS ports and the one or more PTRS ports is based on a selection of the first transmit precoding matrix or the second transmit precoding matrix based on a transmit precoding matrix selection criteria.

In some examples, the transmit precoding matrix selection criteria is based on a lowest SRS resource set identifier associated with either the first transmit precoding matrix or the second transmit precoding matrix.

In some examples, the transmit precoding matrix selection criteria is based on a quantity of PTRS ports resulting from the first transmit precoding matrix or the second transmit precoding matrix.

In some examples, the transmit precoding matrix selection criteria is based on a codebook subset associated with the first transmit precoding matrix and the second transmit precoding matrix. In some examples, the codebook subset indicates a partial-coherent transmit precoding matrix or a non-coherent transmit precoding matrix.

In some examples, the transmit precoding matrix selection criteria is based on a quantity of physical uplink shared channel ports associated with the first transmit precoding matrix and the second transmit precoding matrix.

In some examples, to support outputting the second control signaling, the port association component 1235 may be configured as or otherwise support a means for outputting an indication of a value corresponding to one DMRS port of a set of multiple DMRS ports associated with a UE, where determining the frequency resource association between the one or more DMRS ports and a PTRS port of the one or more PTRS ports is based on the value and a table indicating an association between a single PTRS port and the set of multiple DMRS ports.

In some examples, the port association rule indicates that a first set of one or more PTRS ports are associated with the first SRS resource set and a second set of one or more PTRS ports are associated with the first SRS resource set. In some examples, the first set of one or more PTRS ports is different than the second set of one or more PTRS ports.

In some examples, to support determining the frequency resource association between the one or more DMRS ports and the one or more PTRS ports, the port association component 1235 may be configured as or otherwise support a means for determining a first quantity of PTRS ports associated with the first SRS resource set based on the indication of the one or more SRS resources. In some examples, to support determining the frequency resource association between the one or more DMRS ports and the one or more PTRS ports, the port association component 1235 may be configured as or otherwise support a means for determining a second quantity of PTRS ports associated with the second SRS resource set based on the indication of the one or more SRS resources.

In some examples, to support determining the frequency resource association between the one or more PTRS ports and the one or more DMRS ports of the set of multiple DMRS ports, the port association component 1235 may be configured as or otherwise support a means for determining the first PTRS port index is associated with the first SRS resource set based on the first bit. In some examples, to support determining the frequency resource association between the one or more PTRS ports and the one or more DMRS ports of the set of multiple DMRS ports, the port association component 1235 may be configured as or otherwise support a means for determining the second PTRS port index is associated with the second SRS resource set based on the second bit.

In some examples, to support determining the frequency resource association between the one or more PTRS ports and the one or more DMRS ports of the set of multiple DMRS ports, the port association component 1235 may be configured as or otherwise support a means for determining each PTRS index of the first set of one or more PTRS port indices is associated with a respective DMRS port based on the first set of bits, where the first set of bits is associated with the first SRS resource set. In some examples, to support determining the frequency resource association between the one or more PTRS ports and the one or more DMRS ports of the set of multiple DMRS ports, the port association component 1235 may be configured as or otherwise support a means for determining each PTRS index of the second set of one or more PTRS port indices is associated with a respective DMRS port based on the second set of bits, where the second set of bits is associated with the second SRS resource set.

Figure 13:
FIG. 13 shows a diagram of a system including a device that supports reference signal port association determination for SFN uplink in accordance with one or more aspects of the present disclosure.

FIG. 13 shows a diagram of a system 1300 including a device 1305 that supports reference signal port association determination for SFN uplink in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting reference signal port association determination for SFN uplink). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for outputting first control signaling scheduling transmission of SRSs from a set of multiple SRS resource sets, including at least a first SRS resource set and a second SRS resource set. The communications manager 1320 may be configured as or otherwise support a means for outputting second control signaling including an indication of one or more SRS resources from the set of multiple SRS resource sets and scheduling transmission of one or more SFN uplink messages based on the indication of the one or more SRS resources. The communications manager 1320 may be configured as or otherwise support a means for determining a frequency resource association between one or more PTRS ports and one or more DMRS ports of a set of multiple DMRS ports based on a port association rule and the indication of one or more SRS resources. The communications manager 1320 may be configured as or otherwise support a means for receiving the one or more SFN uplink messages based on the port association rule.

By including or configuring the communications manager 1320 in accordance with examples as described herein, the device 1305 may support techniques for reference signal port association determination for single frequency network SFN uplink, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of reference signal port association determination for SFN uplink as described herein, or the processor 1335 and the memory 1325 may be otherwise configured to perform or support such operations.

Figure 14:
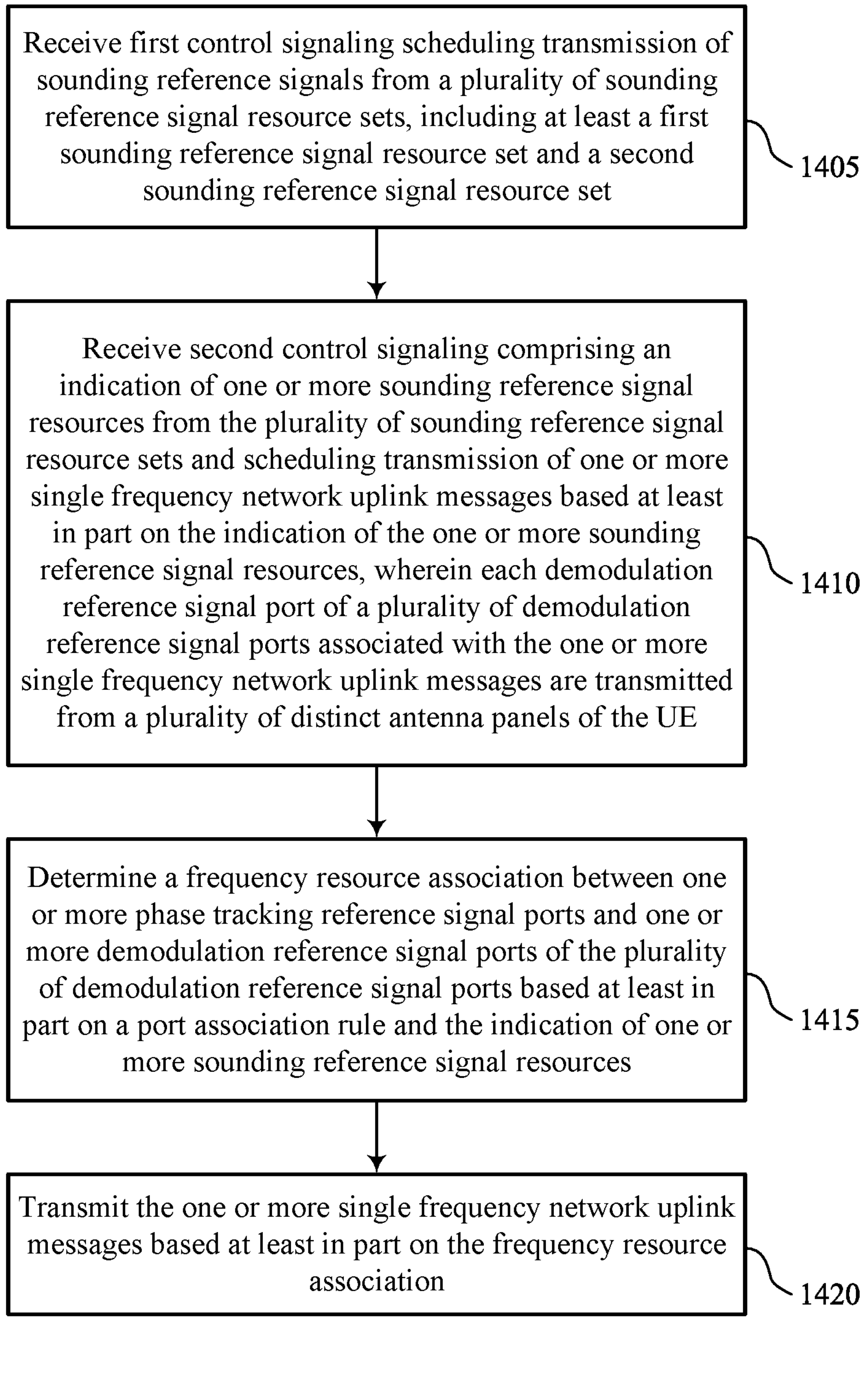
FIGS. 14 and 15 show flowcharts illustrating methods that support reference signal port association determination for SFN uplink in accordance with one or more aspects of the present disclosure.

FIG. 14 shows a flowchart illustrating a method 1400 that supports reference signal port association determination for SFN uplink in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling scheduling transmission of SRSs from a set of multiple SRS resource sets, including at least a first SRS resource set and a second SRS resource set. The operations of 1405 may be performed in accordance with examples as disclosed herein. In some examples, aspects of the operations of 1405 may be performed by a resource set component 825 as described with reference to FIG. 8.

At 1410, the method may include receiving second control signaling including an indication of one or more SRS resources from the set of multiple SRS resource sets and scheduling transmission of one or more SFN uplink messages based on the indication of the one or more SRS resources, where each DMRS port of a set of multiple DMRS ports associated with the one or more SFN uplink messages are transmitted from a set of multiple distinct antenna panels of the UE. The operations of 1410 may be performed in accordance with examples as disclosed herein. In some examples, aspects of the operations of 1410 may be performed by an SFN component 830 as described with reference to FIG. 8.

At 1415, the method may include determining a frequency resource association between one or more PTRS ports and one or more DMRS ports of the set of multiple DMRS ports based on a port association rule and the indication of one or more SRS resources. The operations of 1415 may be performed in accordance with examples as disclosed herein. In some examples, aspects of the operations of 1415 may be performed by a port association component 835 as described with reference to FIG. 8.

At 1420, the method may include transmitting the one or more SFN uplink messages based on the frequency resource association. The operations of 1420 may be performed in accordance with examples as disclosed herein. In some examples, aspects of the operations of 1420 may be performed by an SFN component 830 as described with reference to FIG. 8.

Figure 15:
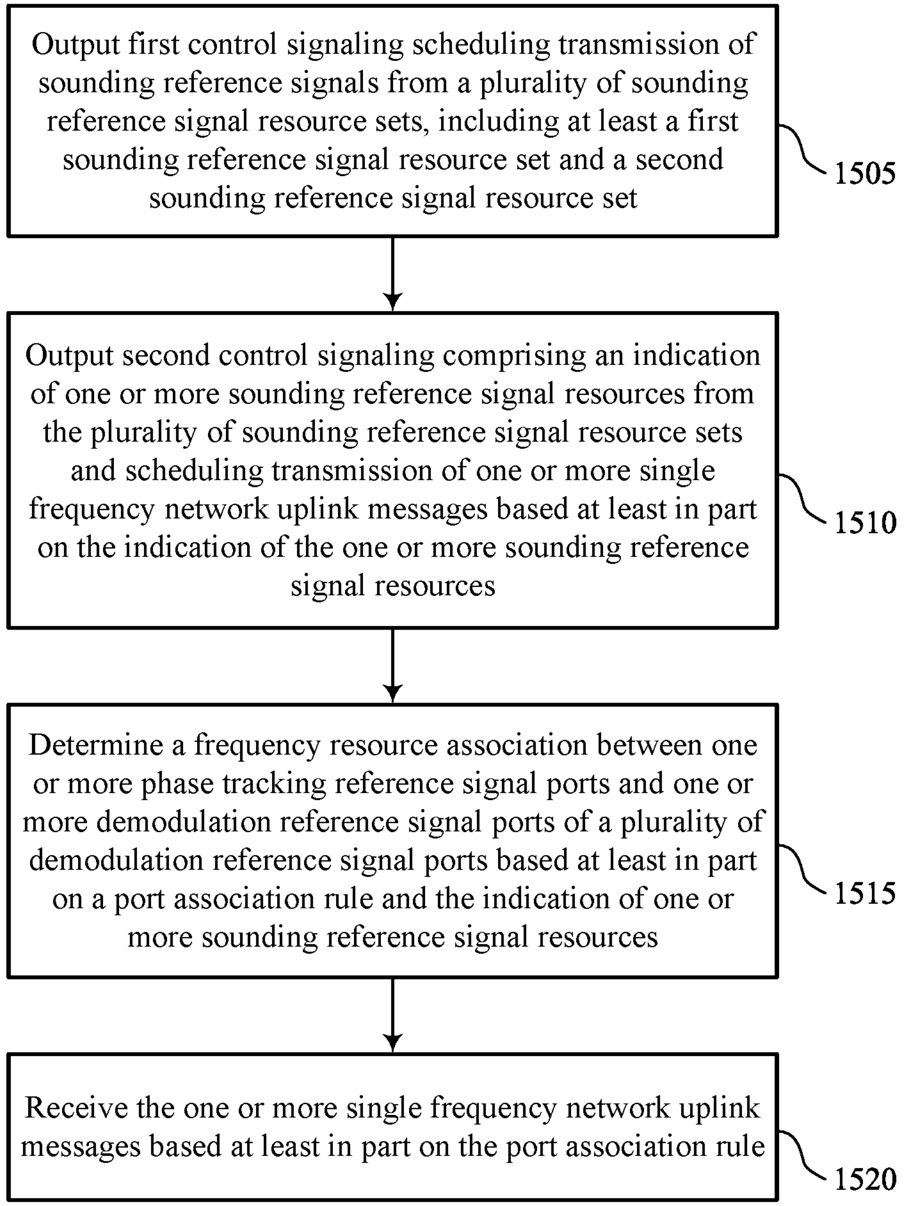

FIG. 15 shows a flowchart illustrating a method 1500 that supports reference signal port association determination for SFN uplink in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include outputting first control signaling scheduling transmission of SRSs from a set of multiple SRS resource sets, including at least a first SRS resource set and a second SRS resource set. The operations of 1505 may be performed in accordance with examples as disclosed herein. In some examples, aspects of the operations of 1505 may be performed by a resource set component 1225 as described with reference to FIG. 12.

At 1510, the method may include outputting second control signaling including an indication of one or more SRS resources from the set of multiple SRS resource sets and scheduling transmission of one or more SFN uplink messages based on the indication of the one or more SRS resources. The operations of 1510 may be performed in accordance with examples as disclosed herein. In some examples, aspects of the operations of 1510 may be performed by an SFN component 1230 as described with reference to FIG. 12.

At 1515, the method may include determining a frequency resource association between one or more PTRS ports and one or more DMRS ports of a set of multiple DMRS ports based on a port association rule and the indication of one or more SRS resources. The operations of 1515 may be performed in accordance with examples as disclosed herein. In some examples, aspects of the operations of 1515 may be performed by a port association component 1235 as described with reference to FIG. 12.

At 1520, the method may include receiving the one or more SFN uplink messages based on the port association rule. The operations of 1520 may be performed in accordance with examples as disclosed herein. In some examples, aspects of the operations of 1520 may be performed by an SFN component 1230 as described with reference to FIG. 12.

The following provides an overview of aspects of the present disclosure:

Aspect 1: A method for wireless communications at a UE, comprising: receiving first control signaling scheduling transmission of SRSs from a plurality of SRS resource sets, including at least a first SRS resource set and a second SRS resource set; receiving second control signaling comprising an indication of one or more SRS resources from the plurality of SRS resource sets and scheduling transmission of one or more SFN uplink messages based at least in part on the indication of the one or more SRS resources, wherein each DMRS port of a plurality of DMRS ports associated with the one or more SFN uplink messages are transmitted from a plurality of distinct antenna panels of the UE; determining a frequency resource association between one or more PTRS ports and one or more DMRS ports of the plurality of DMRS ports based at least in part on a port association rule and the indication of one or more SRS resources; and transmitting the one or more SFN uplink messages based at least in part on the frequency resource association.

Aspect 2: The method of aspect 1, wherein a maximum quantity of PTRS ports for the UE is greater than one, and the one or more SFN uplink messages are non-codebook based messages, and the port association rule indicates that matching SRS resources indices of the first SRS resource set and the second SRS resource set have a same PTRS port index, and determining the frequency resource association between the one or more DMRS ports and the one or more PTRS ports is based at least in part on one or more SRS resources from the first SRS resource set or from the second SRS resource set.

Aspect 3: The method of aspect 1, wherein a maximum quantity of PTRS ports for the UE is greater than one, and the one or more SFN uplink messages are non-codebook based messages, and determining the frequency resource association between the one or more DMRS ports and the one or more PTRS ports is based at least in part on one or more indicated SRS resources from either the first SRS resource set or the second SRS resource set having a lowest SRS resource set identifier.

Aspect 4: The method of aspect 1, wherein a maximum quantity of PTRS ports for the UE is greater than one, and the one or more SFN uplink messages are non-codebook based messages, and the indication of the one or more SRS resources from the plurality of SRS resource sets comprises a first indication of one or more SRS resources from the first SRS resource set that results in a first quantity of PTRS ports and a second indication of one or more SRS resources from the second SRS resource set that results in a second quantity of PTRS ports, and determining the frequency resource association between the one or more DMRS ports and the one or more PTRS ports is based at least in part on the first quantity of PTRS ports, the second quantity of PTRS ports, or both.

Aspect 5: The method of aspect 4, wherein determining the frequency resource association between the one or more DMRS ports and the one or more PTRS ports is based at least in part on either the one or more indicated SRS resources from the first SRS resource set or the one or more indicated SRS resources from the second SRS resource set resulting in a greater quantity of PTRS ports.

Aspect 6: The method of any of aspects 4 through 5, wherein determining the frequency resource association between the one or more DMRS ports and the one or more PTRS ports is based at least in part on either the one or more indicated SRS resources from the first SRS resource set or the one or more indicated SRS resources from the second SRS resource set resulting in a lesser quantity of PTRS ports.

Aspect 7: The method of aspect 1, wherein a maximum quantity of PTRS ports for the UE is greater than one, and the one or more SFN uplink messages are codebook based messages, and the port association rule indicates that sharing associations between DMRS ports and PTRS port indices as indicated in a transmit precoding matrix are common across a plurality of transmit precoding matrices associated with the one or more SFN uplink messages, and determining the frequency resource association between the one or more DMRS ports and the one or more PTRS ports is based at least in part on a first transmit precoding matrix associated with the first SRS resource set or from a second transmit precoding matrix associated with the second SRS resource set.

Aspect 8: The method of aspect 1, wherein a maximum quantity of PTRS ports for the UE is greater than one, and the one or more SFN uplink messages are codebook based messages, and the indication of the one or more SRS resources from the plurality of SRS resource sets comprises a first indication of a first transmit precoding matrix and a second indication of a second transmit precoding matrix, and determining the frequency resource association between the one or more DMRS ports and the one or more PTRS ports is based at least in part on a selection of the first transmit precoding matrix or the second transmit precoding matrix based at least in part on a transmit precoding matrix selection criteria.

Aspect 9: The method of aspect 8, wherein the transmit precoding matrix selection criteria is based at least in part on a lowest SRS resource set identifier associated with either the first transmit precoding matrix or the second transmit precoding matrix.

Aspect 10: The method of aspect 8, wherein the transmit precoding matrix selection criteria is based at least in part on a quantity of PTRS ports resulting from the first transmit precoding matrix or the second transmit precoding matrix.

Aspect 11: The method of aspect 8, wherein the transmit precoding matrix selection criteria is based at least in part on a codebook subset associated with the first transmit precoding matrix and the second transmit precoding matrix, the codebook subset indicates a partial-coherent transmit precoding matrix or a non-coherent transmit precoding matrix.

Aspect 12: The method of aspect 8, wherein the transmit precoding matrix selection criteria is based at least in part on a quantity of physical uplink shared channel ports associated with the first transmit precoding matrix and the second transmit precoding matrix.

Aspect 13: The method of aspect 1, wherein a maximum quantity of PTRS ports for the UE is restricted to one, and wherein receiving the second control signaling comprises: receiving an indication of a value corresponding to one DMRS port of the plurality of DMRS ports, wherein determining the frequency resource association between the one or more DMRS ports and a PTRS port of the one or more PTRS ports is based at least in part on the value and a table indicating an association between a single PTRS port and the plurality of DMRS ports.

Aspect 14: The method of aspect 1, wherein the port association rule indicates that a first set of one or more PTRS ports are associated with the first SRS resource set and a second set of one or more PTRS ports are associated with the first SRS resource set, and the first set of one or more PTRS ports is different than the second set of one or more PTRS ports.

Aspect 15: The method of aspect 14, wherein determining the frequency resource association between the one or more DMRS ports and the one or more PTRS ports comprises: determining a first quantity of PTRS ports associated with the first SRS resource set based at least in part on the indication of the one or more SRS resources; and determining a second quantity of PTRS ports associated with the second SRS resource set based at least in part on the indication of the one or more SRS resources.

Aspect 16: The method of any of aspects 14 through 15, wherein a quantity of transmission layers associated with the one or more SFN uplink messages is two, and wherein the indication of the one or more SRS resources comprises a first bit indicating a first PTRS port index and a second bit indicating a second PTRS port index, and wherein determining the frequency resource association between the one or more PTRS ports and the one or more DMRS ports of the plurality of DMRS ports comprises: determining the first PTRS port index is associated with the first SRS resource set based at least in part on the first bit; and determining the second PTRS port index is associated with the second SRS resource set based at least in part on the second bit.

Aspect 17: The method of any of aspects 14 through 15, wherein a quantity of transmission layers associated with the one or more SFN uplink messages is greater than two, and wherein the indication of the one or more SRS resources comprises a first set of bits indicating a first set of one or more PTRS port indices and a second set of bits indicating a second set of one or more PTRS port indices, and wherein determining the frequency resource association between the one or more PTRS ports and the one or more DMRS ports of the plurality of DMRS ports comprises: determining each PTRS index of the first set of one or more PTRS port indices is associated with a respective DMRS port based at least in part on the first set of bits, wherein the first set of bits is associated with the first SRS resource set; and determining each PTRS index of the second set of one or more PTRS port indices is associated with a respective DMRS port based at least in part on the second set of bits, wherein the second set of bits is associated with the second SRS resource set.

Aspect 18: A method for wireless communications at a network entity, comprising: outputting first control signaling scheduling transmission of SRSs from a plurality of SRS resource sets, including at least a first SRS resource set and a second SRS resource set; outputting second control signaling comprising an indication of one or more SRS resources from the plurality of SRS resource sets and scheduling transmission of one or more SFN uplink messages based at least in part on the indication of the one or more SRS resources; determining a frequency resource association between one or more PTRS ports and one or more DMRS ports of a plurality of DMRS ports based at least in part on a port association rule and the indication of one or more SRS resources; and receiving the one or more SFN uplink messages based at least in part on the port association rule.

Aspect 19: The method of aspect 18, wherein a maximum quantity of PTRS ports for a UE is greater than one, and the one or more SFN uplink messages are non-codebook based messages, and the port association rule indicates that matching SRS resources indices of the first SRS resource set and the second SRS resource set have a same PTRS port index.

Aspect 20: The method of any of aspects 18 through 19, wherein a maximum quantity of PTRS ports for a UE is greater than one, and the one or more SFN uplink messages are non-codebook based messages, and determining the frequency resource association between the one or more DMRS ports and the one or more PTRS ports is based at least in part on one or more indicated SRS resources from either the first SRS resource set or the second SRS resource set having a lowest SRS resource set identifier.

Aspect 21: The method of any of aspects 18 through 20, wherein a maximum quantity of PTRS ports for a UE is greater than one, and the one or more SFN uplink messages are non-codebook based messages, the indication of the one or more SRS resources from the plurality of SRS resource sets comprises a first indication of one or more SRS resources from the first SRS resource set that results in a first quantity of PTRS ports and a second indication of one or more SRS resources from the second SRS resource set that results in a second quantity of PTRS ports, and determining the frequency resource association between the one or more DMRS ports and the one or more PTRS ports is based at least in part on the first quantity of PTRS ports, the second quantity of PTRS ports, or both.

Aspect 22: The method of any of aspects 18 through 21, wherein a maximum quantity of PTRS ports for a UE is greater than one, and the one or more SFN uplink messages are codebook based messages, and the port association rule indicates that sharing associations between DMRS ports and PTRS port indices as indicated in a transmit precoding matrix are common across a plurality of transmit precoding matrices associated with the one or more SFN uplink messages, and determining the frequency resource association between the one or more DMRS ports and the one or more PTRS ports is based at least in part on a first transmit precoding matrix associated with the first SRS resource set or from a second transmit precoding matrix associated with the second SRS resource set.

Aspect 23: The method of any of aspects 18 through 22, wherein a maximum quantity of PTRS ports for a UE is greater than one, and the one or more SFN uplink messages are codebook based messages, and the indication of the one or more SRS resources from the plurality of SRS resource sets comprises a first indication of a first transmit precoding matrix and a second indication of a second transmit precoding matrix, and determining the frequency resource association between the one or more DMRS ports and the one or more PTRS ports is based at least in part on a selection of the first transmit precoding matrix or the second transmit precoding matrix based at least in part on a transmit precoding matrix selection criteria.

Aspect 24: The method of any of aspects 18 through 23, wherein a maximum quantity of PTRS ports for a UE is restricted to one, wherein outputting the second control signaling comprises: outputting an indication of a value corresponding to one DMRS port of a plurality of DMRS ports associated with a UE, wherein determining the frequency resource association between the one or more DMRS ports and a PTRS port of the one or more PTRS ports is based at least in part on the value and a table indicating an association between a single PTRS port and the plurality of DMRS ports.

Aspect 25: The method of any of aspects 18 through 24, wherein the port association rule indicates that a first set of one or more PTRS ports are associated with the first SRS resource set and a second set of one or more PTRS ports are associated with the first SRS resource set, and the first set of one or more PTRS ports is different than the second set of one or more PTRS ports.

Aspect 26: The method of aspect 25, wherein determining the frequency resource association between the one or more DMRS ports and the one or more PTRS ports comprises: determining a first quantity of PTRS ports associated with the first SRS resource set based at least in part on the indication of the one or more SRS resources; and determining a second quantity of PTRS ports associated with the second SRS resource set based at least in part on the indication of the one or more SRS resources.

Aspect 27: The method of any of aspects 25 through 26, wherein a quantity of transmission layers associated with the one or more SFN uplink messages is two, and wherein the indication of the one or more SRS resources comprises a first bit indicating a first PTRS port index and a second bit indicating a second PTRS port index, and wherein determining the frequency resource association between the one or more PTRS ports and the one or more DMRS ports of the plurality of DMRS ports comprises: determining the first PTRS port index is associated with the first SRS resource set based at least in part on the first bit; and determining the second PTRS port index is associated with the second SRS resource set based at least in part on the second bit.

Aspect 28: The method of any of aspects 25 through 27, wherein a quantity of transmission layers associated with the one or more SFN uplink messages is greater than two, and wherein the indication of the one or more SRS resources comprises a first set of bits indicating a first set of one or more PTRS port indices and a second set of bits indicating a second set of one or more PTRS port indices, and wherein determining the frequency resource association between the one or more PTRS ports and the one or more DMRS ports of the plurality of DMRS ports comprises: determining each PTRS index of the first set of one or more PTRS port indices is associated with a respective DMRS port based at least in part on the first set of bits, wherein the first set of bits is associated with the first SRS resource set; and determining each PTRS index of the second set of one or more PTRS port indices is associated with a respective DMRS port based at least in part on the second set of bits, wherein the second set of bits is associated with the second SRS resource set.

Aspect 29: An apparatus for wireless communications at a UE, comprising a processor; memory coupled with the processor; and instructions stored in the memory and executable by the processor to cause the apparatus to perform a method of any of aspects 1 through 17.

Aspect 30: An apparatus for wireless communications at a UE, comprising at least one means for performing a method of any of aspects 1 through 17.

Aspect 31: A non-transitory computer-readable medium storing code for wireless communications at a UE, the code comprising instructions executable by a processor to perform a method of any of aspects 1 through 17.

Aspect 32: An apparatus for wireless communications at a network entity, comprising a processor; memory coupled with the processor; and instructions stored in the memory and executable by the processor to cause the apparatus to perform a method of any of aspects 18 through 28.

Aspect 33: An apparatus for wireless communications at a network entity, comprising at least one means for performing a method of any of aspects 18 through 28.

Aspect 34: A non-transitory computer-readable medium storing code for wireless communications at a network entity, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving first control signaling scheduling transmission of sounding reference signals from a plurality of sounding reference signal resource sets, including at least a first sounding reference signal resource set and a second sounding reference signal resource set;

receiving second control signaling comprising an indication of one or more sounding reference signal resources from the plurality of sounding reference signal resource sets and scheduling transmission of one or more single frequency network uplink messages associated with the plurality of sounding reference signal resource sets based at least in part on the indication of the one or more sounding reference signal resources, and wherein the indication of the one or more sounding reference signal resources from the plurality of sounding reference signal resource sets comprises a first indication of a first transmit precoding matrix associated with the first sounding reference signal resource set and a second indication of a second transmit precoding matrix associated with the second sounding reference signal resource set;

and transmitting the one or more single frequency network uplink messages via one or more phase tracking reference signal ports, wherein a same quantity of the one or more phase tracking reference signal ports corresponding to each of the first sounding reference signal resource set and the second sounding reference signal resource set is determined based at least in part on the first transmit precoding matrix in accordance with the first transmit precoding matrix being associated with a lowest identifier of the first transmit precoding matrix and the second transmit precoding matrix.

2. The method of claim 1, wherein a maximum quantity of phase tracking reference signal ports for the UE is greater than one, and wherein the one or more single frequency network uplink messages are non-codebook based messages, and wherein a port association rule indicates that matching sounding reference signal resources indices of the first sounding reference signal resource set and the second sounding reference signal resource set have a same phase tracking reference signal port index, and wherein determining a frequency resource association between one or more demodulation reference signal ports and the one or more phase tracking reference signal ports is based at least in part on one or more sounding reference signal resources from the first sounding reference signal resource set in accordance with the first transmit precoding matrix being associated with a lowest identifier.

3. The method of claim 1, wherein a maximum quantity of phase tracking reference signal ports for the UE is greater than one, and wherein the one or more single frequency network uplink messages are non-codebook based messages, and wherein determining a frequency resource association between one or more demodulation reference signal ports and the one or more phase tracking reference signal ports is based at least in part on one or more indicated sounding reference signal resources from the first sounding reference signal resource set having a lowest sounding reference signal resource set identifier, and wherein the lowest identifier associated with the first transmit precoding matrix is the lowest sounding reference signal resource set identifier.

4. The method of claim 1, wherein a maximum quantity of phase tracking reference signal ports for the UE is greater than one, and wherein the one or more single frequency network uplink messages are non-codebook based messages, wherein the indication of the one or more sounding reference signal resources from the plurality of sounding reference signal resource sets comprises the first indication of one or more sounding reference signal resources from the first sounding reference signal resource set that results in a first quantity of phase tracking reference signal ports and the second indication of one or more sounding reference signal resources from the second sounding reference signal resource set that results in a second quantity of phase tracking reference signal ports, and wherein determining a frequency resource association between one or more demodulation reference signal ports and the one or more phase tracking reference signal ports is based at least in part on the first quantity of phase tracking reference signal ports, the second quantity of phase tracking reference signal ports, or both.

5. The method of claim 4, wherein determining the frequency resource association between the one or more demodulation reference signal ports and the one or more phase tracking reference signal ports is based at least in part on the one or more sounding reference signal resources from the first sounding reference signal resource set resulting in a greater quantity of phase tracking reference signal ports.

6. The method of claim 4, wherein determining the frequency resource association between the one or more demodulation reference signal ports and the one or more phase tracking reference signal ports is based at least in part on the one or more sounding reference signal resources from the first sounding reference signal resource set resulting in a lesser quantity of phase tracking reference signal ports.

7. The method of claim 1, wherein a maximum quantity of phase tracking reference signal ports for the UE is greater than one, and wherein the one or more single frequency network uplink messages are codebook based messages, and wherein a port association rule indicates that sharing associations between demodulation reference signal ports and phase tracking reference signal port indices as indicated in a transmit precoding matrix are common across a plurality of transmit precoding matrices associated with the one or more single frequency network uplink messages, and wherein determining a frequency resource association between one or more demodulation reference signal ports and the one or more phase tracking reference signal ports is based at least in part on the first transmit precoding matrix associated with the first sounding reference signal resource set.

8. The method of claim 1, wherein a maximum quantity of phase tracking reference signal ports for the UE is greater than one, and wherein the one or more single frequency network uplink messages are codebook based messages.

9. The method of claim 8, wherein the lowest identifier associated with the first transmit precoding matrix is a lowest sounding reference signal resource set identifier.

10. The method of claim 1, wherein a maximum quantity of phase tracking reference signal ports for the UE is restricted to one, and wherein receiving the second control signaling comprises:

receiving an indication of a value corresponding to one demodulation reference signal port of a plurality of demodulation reference signal ports, wherein determining a frequency resource association between one or more demodulation reference signal ports of the plurality of demodulation reference signal ports and a phase tracking reference signal port of the one or more phase tracking reference signal ports is based at least in part on the value and a table indicating an association between a single phase tracking reference signal port and the plurality of demodulation reference signal ports.

11. The method of claim 1, wherein a port association rule indicates that a first set of one or more phase tracking reference signal ports are associated with the first sounding reference signal resource set and a second set of one or more phase tracking reference signal ports are associated with the first sounding reference signal resource set, and wherein the first set of one or more phase tracking reference signal ports is different than the second set of one or more phase tracking reference signal ports.

12. The method of claim 11, wherein determining a frequency resource association between one or more demodulation reference signal ports and the one or more phase tracking reference signal ports comprises:

determining a first quantity of phase tracking reference signal ports associated with the first sounding reference signal resource set based at least in part on the indication of the one or more sounding reference signal resources; and determining a second quantity of phase tracking reference signal ports associated with the second sounding reference signal resource set based at least in part on the indication of the one or more sounding reference signal resources.

13. The method of claim 11, wherein a quantity of transmission layers associated with the one or more single frequency network uplink messages is two, and wherein the indication of the one or more sounding reference signal resources comprises a first bit indicating a first phase tracking reference signal port index and a second bit indicating a second phase tracking reference signal port index, and wherein determining a frequency resource association between the one or more phase tracking reference signal ports and one or more demodulation reference signal ports comprises:

determining the first phase tracking reference signal port index is associated with the first sounding reference signal resource set based at least in part on the first bit; and determining the second phase tracking reference signal port index is associated with the second sounding reference signal resource set based at least in part on the second bit.

14. The method of claim 11, wherein a quantity of transmission layers associated with the one or more single frequency network uplink messages is greater than two, and wherein the indication of the one or more sounding reference signal resources comprises a first set of bits indicating a first set of one or more phase tracking reference signal port indices and a second set of bits indicating a second set of one or more phase tracking reference signal port indices, and wherein determining a frequency resource association between the one or more phase tracking reference signal ports and one or more demodulation reference signal ports comprises:

determining each phase tracking reference signal index of the first set of one or more phase tracking reference signal port indices is associated with a respective demodulation reference signal port based at least in part on the first set of bits, wherein the first set of bits is associated with the first sounding reference signal resource set; and determining each phase tracking reference signal index of the second set of one or more phase tracking reference signal port indices is associated with a respective demodulation reference signal port based at least in part on the second set of bits, wherein the second set of bits is associated with the second sounding reference signal resource set.

15. A method for wireless communications at a network entity, comprising:

outputting first control signaling scheduling transmission of sounding reference signals from a plurality of sounding reference signal resource sets, including at least a first sounding reference signal resource set and a second sounding reference signal resource set;

outputting second control signaling comprising an indication of one or more sounding reference signal resources from the plurality of sounding reference signal resource sets and scheduling transmission of one or more single frequency network uplink messages associated with the plurality of sounding reference signal resource sets based at least in part on the indication of the one or more sounding reference signal resources, wherein the indication of the one or more sounding reference signal resources from the plurality of sounding reference signal resource sets comprises a first indication of a first transmit precoding matrix associated with the first sounding reference signal resource set and a second indication of a second transmit precoding matrix associated with the second sounding reference signal resource set; and receiving the one or more single frequency network uplink messages via one or more phase tracking reference signal ports, wherein a same quantity of the one or more phase tracking reference signal ports corresponding to each of the first sounding reference signal resource set and the second sounding reference signal resource set is determined based at least in part on the first transmit precoding matrix in accordance with the first transmit precoding matrix being associated with a lowest identifier of the first transmit precoding matrix and the second transmit precoding matrix.

16. The method of claim 15, wherein a maximum quantity of phase tracking reference signal ports for a user equipment (UE) is greater than one, and wherein the one or more single frequency network uplink messages are non-codebook based messages, and wherein a port association rule indicates that matching sounding reference signal resources indices of the first sounding reference signal resource set and the second sounding reference signal resource set have a same phase tracking reference signal port index.

17. The method of claim 15, wherein a maximum quantity of phase tracking reference signal ports for a UE is greater than one, and wherein the one or more single frequency network uplink messages are non-codebook based messages, wherein determining a frequency resource association between one or more demodulation reference signal ports of a plurality of demodulation reference signal ports and the one or more phase tracking reference signal ports is based at least in part on one or more indicated sounding reference signal resources from the first sounding reference signal resource set having a lowest sounding reference signal resource set identifier, and wherein the lowest identifier associated with the first transmit precoding matrix is the lowest sounding reference signal resource set identifier.

18. The method of claim 15, wherein a maximum quantity of phase tracking reference signal ports for a UE is greater than one, and wherein the one or more single frequency network uplink messages are non-codebook based messages, wherein the indication of the one or more sounding reference signal resources from the plurality of sounding reference signal resource sets comprises the first indication of one or more sounding reference signal resources from the first sounding reference signal resource set that results in a first quantity of phase tracking reference signal ports and the second indication of one or more sounding reference signal resources from the second sounding reference signal resource set that results in a second quantity of phase tracking reference signal ports, and wherein determining a frequency resource association between one or more demodulation reference signal ports of a plurality of demodulation reference signal ports and the one or more phase tracking reference signal ports is based at least in part on the first quantity of phase tracking reference signal ports, the second quantity of phase tracking reference signal ports, or both.

19. The method of claim 15, wherein a maximum quantity of phase tracking reference signal ports for a UE is greater than one, and wherein the one or more single frequency network uplink messages are codebook based messages, and wherein a port association rule indicates that sharing associations between demodulation reference signal ports and phase tracking reference signal port indices as indicated in a transmit precoding matrix are common across a plurality of transmit precoding matrices associated with the one or more single frequency network uplink messages, and wherein determining a frequency resource association between one or more demodulation reference signal ports of a plurality of demodulation reference signal ports and the one or more phase tracking reference signal ports is based at least in part on the first transmit precoding matrix associated with the first sounding reference signal resource set.

20. The method of claim 15, wherein a maximum quantity of phase tracking reference signal ports for a UE is greater than one, and wherein the one or more single frequency network uplink messages are codebook based messages.

21. The method of claim 15, wherein a maximum quantity of phase tracking reference signal ports for a UE is restricted to one, wherein outputting the second control signaling comprises:

outputting an indication of a value corresponding to one demodulation reference signal port of a plurality of demodulation reference signal ports associated with a user equipment (UE), wherein determining a frequency resource association between one or more demodulation reference signal ports of the plurality of demodulation reference signal ports and a phase tracking reference signal port of the one or more phase tracking reference signal ports is based at least in part on the value and a table indicating an association between a single phase tracking reference signal port and the plurality of demodulation reference signal ports.

22. The method of claim 15, wherein a port association rule indicates that a first set of one or more phase tracking reference signal ports are associated with the first sounding reference signal resource set and a second set of one or more phase tracking reference signal ports are associated with the first sounding reference signal resource set, and wherein the first set of one or more phase tracking reference signal ports is different than the second set of one or more phase tracking reference signal ports.

23. The method of claim 22, wherein determining a frequency resource association between one or more demodulation reference signal ports of a plurality of demodulation reference signal ports and the one or more phase tracking reference signal ports comprises:

determining a first quantity of phase tracking reference signal ports associated with the first sounding reference signal resource set based at least in part on the indication of the one or more sounding reference signal resources; and determining a second quantity of phase tracking reference signal ports associated with the second sounding reference signal resource set based at least in part on the indication of the one or more sounding reference signal resources.

24. The method of claim 22, wherein a quantity of transmission layers associated with the one or more single frequency network uplink messages is two, and wherein the indication of the one or more sounding reference signal resources comprises a first bit indicating a first phase tracking reference signal port index and a second bit indicating a second phase tracking reference signal port index, and wherein determining a frequency resource association between the one or more phase tracking reference signal ports and one or more demodulation reference signal ports of a plurality of demodulation reference signal ports comprises:

determining the first phase tracking reference signal port index is associated with the first sounding reference signal resource set based at least in part on the first bit; and determining the second phase tracking reference signal port index is associated with the second sounding reference signal resource set based at least in part on the second bit.

25. The method of claim 22, wherein a quantity of transmission layers associated with the one or more single frequency network uplink messages is greater than two, and wherein the indication of the one or more sounding reference signal resources comprises a first set of bits indicating a first set of one or more phase tracking reference signal port indices and a second set of bits indicating a second set of one or more phase tracking reference signal port indices, and wherein determining a frequency resource association between the one or more phase tracking reference signal ports and one or more demodulation reference signal ports of a plurality of demodulation reference signal ports comprises:

determining each phase tracking reference signal index of the first set of one or more phase tracking reference signal port indices is associated with a respective demodulation reference signal port based at least in part on the first set of bits, wherein the first set of bits is associated with the first sounding reference signal resource set; and determining each phase tracking reference signal index of the second set of one or more phase tracking reference signal port indices is associated with a respective demodulation reference signal port based at least in part on the second set of bits, wherein the second set of bits is associated with the second sounding reference signal resource set.

26. An apparatus for wireless communications at a user equipment (UE), comprising:

one or more processors;

one or more memories coupled with the one or more processors; and instructions stored in the one or more memories and executable by the one or more processors to cause the apparatus to:

receive first control signaling scheduling transmission of sounding reference signals from a plurality of sounding reference signal resource sets, including at least a first sounding reference signal resource set and a second sounding reference signal resource set;

receive second control signaling comprising an indication of one or more sounding reference signal resources from the plurality of sounding reference signal resource sets and scheduling transmission of one or more single frequency network uplink messages associated with the plurality of sounding reference signal resource sets based at least in part on the indication of the one or more sounding reference signal resources, wherein the indication of the one or more sounding reference signal resources from the plurality of sounding reference signal resource sets comprises a first indication of a first transmit precoding matrix associated with the first sounding reference signal resource set and a second indication of a second transmit precoding matrix associated with the second sounding reference signal resource set;

and transmit the one or more single frequency network uplink messages via one or more phase tracking reference signal ports, wherein a same quantity of the one or more phase tracking reference signal ports corresponding to each of the first sounding reference signal resource set and the second sounding reference signal resource set is determined based at least in part on the first transmit precoding matrix in accordance with the first transmit precoding matrix being associated with a lowest identifier of the first transmit precoding matrix and the second transmit precoding matrix.

27. An apparatus for wireless communications at a network entity, comprising:

one or more processors;

one or more memories coupled with the one or more processors; and instructions stored in the one or more memories and executable by the one or more processors to cause the apparatus to:

output first control signaling scheduling transmission of sounding reference signals from a plurality of sounding reference signal resource sets, including at least a first sounding reference signal resource set and a second sounding reference signal resource set;

output second control signaling comprising an indication of one or more sounding reference signal resources from the plurality of sounding reference signal resource sets and scheduling transmission of one or more single frequency network uplink messages associated with the plurality of sounding reference signal resource sets based at least in part on the indication of the one or more sounding reference signal resources, wherein the indication of the one or more sounding reference signal resources from the plurality of sounding reference signal resource sets comprises a first indication of a first transmit precoding matrix associated with the first sounding reference signal resource set and a second indication of a second transmit precoding matrix associated with the second sounding reference signal resource set; and receive the one or more single frequency network uplink messages via one or more phase tracking reference signal ports, wherein a same quantity of the one or more phase tracking reference signal ports corresponding to each of the first sounding reference signal resource set and the second sounding reference signal resource set is determined based at least in part on the first transmit precoding matrix in accordance with the first transmit precoding matrix being associated with a lowest identifier of the first transmit precoding matrix and the second transmit precoding matrix.

* * * * *